United States Patent
Ahuja et al.

(10) Patent No.: US 11,915,131 B2
(45) Date of Patent: Feb. 27, 2024

(54) INITIALIZING OPTIMIZATION SOLVERS

(71) Applicant: International Business Machines Corporation, Armonk, NY (US)

(72) Inventors: Kartik Ahuja, White Plains, NY (US); Amit Dhurandhar, Yorktown Heights, NY (US); Karthikeyan Shanmugam, Elmsford, NY (US); Kush Raj Varshney, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 17/101,019

(22) Filed: Nov. 23, 2020

(65) Prior Publication Data

US 2022/0164644 A1 May 26, 2022

(51) Int. Cl.
*G06N 3/08* (2023.01)
*G06N 7/00* (2023.01)
(Continued)

(52) U.S. Cl.
CPC .............. *G06N 3/08* (2013.01); *G06N 3/047* (2023.01); *G06N 3/084* (2013.01); *G06N 7/00* (2013.01);
(Continued)

(58) Field of Classification Search
CPC .......... G06N 3/08; G06N 3/047; G06N 3/084; G06N 7/00; G06N 20/00; G06F 9/3836; G06F 17/16; G06F 18/214
See application file for complete search history.

(56) References Cited

U.S. PATENT DOCUMENTS 11,443,162 B2 * 9/2022 Yang ........................ G06N 3/04
11,663,488 B2 * 5/2023 Volkovs ................ G06F 18/214
712/7
(Continued)

FOREIGN PATENT DOCUMENTS

WO WO-2021198238 A1 * 10/2021 ............. G06T 5/005
WO WO-2022049616 A1 * 3/2022 ............... G06F 3/14

OTHER PUBLICATIONS

Zhang et al., "FixUp Initialization: Residual Learning Without Normalization" Mar. 12, 2019, arXiv: 1901.09321v2, 1-16. (Year: 2019).*

(Continued)

*Primary Examiner* — Miranda M Huang
*Assistant Examiner* — Chase P. Hinckley
(74) *Attorney, Agent, or Firm* — Joseph P. Curcuru

(57) ABSTRACT

In an approach to improve the efficiency of solving problem instances by utilizing a machine learning model to solve a sequential optimization problem. Embodiments of the present invention receive a sequential optimization problem for solving and utilize a random initialization to solve a first instance of the sequential optimization problem. Embodiments of the present invention learning, by a computing device a machine learning model, based on a previously stored solution to the first instance of the sequential optimization problem. Additionally, embodiments of the present invention generate, by the machine learning model, one or more subsequent approximate solutions to the sequential optimization problem; and output, by a user interface on the computing device, the one or more subsequent approximate solutions to the sequential optimization problem.

20 Claims, 14 Drawing Sheets

(51) Int. Cl.
    *G06N 20/00*     (2019.01)
    *G06N 3/047*     (2023.01)
    *G06N 3/084*     (2023.01)
    *G06F 9/38*     (2018.01)
    *G06F 18/214*     (2023.01)
    *G06F 17/16*     (2006.01)

(52) U.S. Cl.
    CPC ........... *G06N 20/00* (2019.01); *G06F 9/3836* (2013.01); *G06F 17/16* (2013.01); *G06F 18/214* (2023.01)

(56) References Cited

U.S. PATENT DOCUMENTS

| | | | |
|---|---|---|---|
| 2017/0161612 A1* | 6/2017 | Hastings | G06N 20/00 |
| 2021/0073465 A1* | 3/2021 | Duong | G06N 3/045 |
| 2021/0216858 A1* | 7/2021 | Hekmatshoartabari | G06N 3/04 |
| 2021/0255862 A1* | 8/2021 | Volkovs | G06N 3/084 |
| 2022/0108174 A1* | 4/2022 | Dauphin | G06N 3/08 |
| 2022/0114476 A1* | 4/2022 | Bui | G06N 3/044 |
| 2022/0129450 A1* | 4/2022 | Cao | G06F 16/243 |
| 2022/0207362 A1* | 6/2022 | Meyerson | G06N 20/10 |
| 2023/0079940 A1* | 3/2023 | Miyagawa | G06F 9/451 345/441 |
| 2023/0088669 A1* | 3/2023 | Bingham | G06N 3/04 |
| 2023/0144724 A1* | 5/2023 | Major | G06T 7/0012 382/128 |

OTHER PUBLICATIONS

Wong et al., "Fast is Better than Free: Revisiting Adversarial Training" Jan. 12, 2020, arXiv: 2001.03994v1, pp. 1-17. (Year: 2020).*

Mghabbar et Ratnamogan, "Building a Multi-domain Neural Machine Translation Model using Knowledge Distillation" Apr. 15, 2020, arXiv: 2004.07324v1, pp. 1-8. (Year: 2020).*

Jung et al., "Continual Learning with Node-Importance based Adaptive Group Sparse Regularization" Jun. 16, 2020, arXiv: 2003.13726v2, pp. 1-19. (Year: 2020).*

Arpit et al., "How to Initialize your Network? Robust Initialization for WeightNorm & ResNets" Oct. 30, 2019, arXiv: 1906.02341v2, pp. 1-19. (Year: 2019).*

Blumenfeld et al., "Beyond Signal Propagation: Is Feature Diversity Necessary in Deep Neural Network Initialization?" Jul. 2, 2020, arXiv: 2007.01038v1, pp. 1-26. (Year: 2020).*

Chen et al., "Distributed Projected Subgradient Method for Weakly Convex Optimization" Apr. 28, 2020, arXiv: 2004.13233v1, pp. 1-15. (Year: 2020).*

De et Smith, "Batch Normalization Biases Residual Blocks Towards the Identity Function in Deep Networks" Jun. 18, 2020, arXiv: 2002.10444v2, pp. 1-17. (Year: 2020).*

Huang et al., "Improving Transformer Optimization Through Better Initialization" Jul. 13, 2020, pp. 1-38. (Year: 2020).*

Li et al., "RIFLE: Backpropagation Depth for Deep Transfer Learning through Re-initializing the Fully-connected LayEr" Jul. 7, 2020, arXiv: 2007.03349v1, pp. 1-10. (Year: 2020).*

Skorski et al., "Revisiting Weight Initialization of Deep Neural Networks" Jun. 4, 2020, arXiv: 2004.09506v3, pp. 1-10. (Year: 2020).*

Mu et al., "Parameter Re-Initialization through Cyclical Batch Size Schedules" Dec. 4, 2018, arXiv: 1812.01216v1, pp. 1-11. (Year: 2018).*

Bachlechner et al., "ReZero is All You Need: Fast Convergence at Large Depth" Jun. 25, 2020, arXiv: 2003.04887v2, pp. 1-14. (Year : 2020).*

Dauphin et Schoenholz, "Metalnit: Initializing learning by learning to initialize" 2019, NuerIPS, pp. 1-13. (Year: 2019).*

Li et al., "RIFLE: Backpropagation in Depth for Deep Transfer Learning through Re-Initializing the Fully-connected LayEr" Jul. 7, 2020, arXiv: 2007.03349v1, pp. 1-10. (Year: 2020).*

Bhattacharya, Arkajit, "Learnable weight initialization for neural networks" 2020, pp. 1-10. (Year: 2020).*

Huang et al., "On the Neural Tangent Kernel of Deep Networks with Orthogonal Initialization" Oct. 11, 2020, arXiv: 2004.05867v3, pp. 1-22. (Year: 2020).*

Hu et al., "Provable Benefit of Orthogonal Initialization in Optimizing Deep Linear Networks" Jan. 16, 2020, arXiv: 2001.05992v1, pp. 1-16. (Year: 2020).*

Limnios et al., "Hcore-Init: Neural Network Initialization based on Graph Degeneracy" Apr. 16, 2020, arXiv: 2004.07636v1, pp . 1-7. (Year: 2020).*

Ahuja et al., "Learning to Initialize Gradient Descent Using Gradient Descent", printed on Jul. 21, 2020, 10 pages.

Andrychowicz et al., "Learning to learn by gradient descent by gradient descent", 30th Conference on Neural Information Processing Systems (NIPS 2016), Barcelona, Spain, 9 pages.

Dauphin et al., "Metalnit: Initializing learning by learning to initialize", 33rd Conference on Neural Information Processing Systems (NeurIPS 2019), Vancouver, Canada, 13 pages.

Finn, Chelsea, "Learning to Learn with Gradients", UC Berkeley Electronic Theses and Dissertations, 2018, 199 pages, <https://escholarship.org/content/qt0987d4n3/qt0987d4n3.pdf>.

Li et al., "Learning to Optimize", arXiv: 1606.01885v1 [cs.LG] Jun. 6, 2016, 9 pages.

Li et al., "Meta-sgd: Learning to Learn Quickly for Few-Shot Learning", arXiv:1707.09835v2 [cs.LG] Sep. 28, 2017, 11 pages.

Lv et al., "Learning Gradient Descent: Better Generalization and Longer Horizons," Proceedings of the 34th International Conference on Machine Learning—vol. 70, 2017, 9 pages.

* cited by examiner

Algorithm 1 Gradient Descent Algorithm (GD)

Input: function $g$, initial value $\theta_0$, $\epsilon$, $\text{iter}_{max}$, step size rules $\{t_k\}_{k=0}^{\infty}$ Initialize: $\text{iter} = 0$ while $\text{iter} \leq \text{iter}_{max}$ and $\|\nabla_\theta g(\theta)\|_{\theta=\theta_{iter}} \leq \epsilon$ do

$\theta_{iter+1} = \Pi_\Theta [\theta_{iter} - t_{iter} \nabla_\theta g(\theta)]$, where $\Pi_\Theta$ is the projection on the set $\Theta$ $\text{iter} = \text{iter} + 1$ end while

$\theta^\dagger = \theta_{iter}$, $g^\dagger = g(\theta_{iter+1})$

Output: $\theta^\dagger, g^\dagger$

FIG. 4

---

Algorithm 2 Learn Values to Initialize (Val-Init)

---

Input: Instances $\{x_i\}_{i=0}^{\infty}$, $H_{val}$ Hypothesis class for $h_{val}$ Initialize: $D = \Phi$ for $i \in \{0, ...\infty\}$ do if $i \leq N$ then

$\theta_0^i = \text{Rand}(\Theta)$ $\theta_i^\dagger, f_i^\dagger = \text{GD}(f(.,x_i), \theta_0^i)$ $D = D \cup \{(\theta_0^i, \theta_i^\dagger, f_i^\dagger)\}$ end if

$h_{val} = \text{argmin}_{h = \in H_{val}} \sum_{j=1}^{N} \ell(h(\theta_0^j, x_j), f_j^\dagger)$ if $i \geq N+1$ then for $m \in \{0, .., M-1\}$ do

$\theta_0^m = \text{Rand}(\Theta)$ $y_p^m = h_{val}(\theta_0^m, x_i)$ end for

$m^* = \text{argmin}\{y_p^m\}_{m=0}^{M-1}$ $\theta^{val,i}, f^{val,i} = \text{GD}(f(.,x_i), \theta_0^{m^*})$ end if end for

Algorithm 3 Learn Arguments to Initialize (Arg-Init)

Input: Instances $\{x_i\}_{i=0}^{\infty}$, $H_{arg}$ Hypothesis class for $h_{arg}$
Initialize: $D = \Phi$
for $i \in \{0, ...\infty\}$ do
    if $i \leq N$ then
        $\theta_0^i = \text{Rand}(\Theta)$
        $\theta_i^\dagger, f_i^\dagger = \text{GD}(f(.,x_i), \theta_0^i)$
        $D = D \cup \{(\theta_0^i, \theta_i^\dagger, f_i^\dagger)\}$
    end if
    $h_{arg} = \text{argmin}_{h = \in H_{arg}} \sum_{j=1}^{N} \ell(h(\theta_0^j, x_j), \theta_j^\dagger)$
    if $i \geq N + 1$ then
        $\theta_0^i = \text{Rand}(\Theta)$
        $\theta_0^i = h_{arg}(\theta_0^i, x_i)$
        $\theta^{arg,i}, f^{arg,i} = \text{GD}(f(.,x_i), \theta_0^i)$
    end if
end for

FIG. 6

| METHOD | $m = 5$ | $m = 25$ | $m = 50$ |
|---|---|---|---|
| RANDOM | 4.18, 0.0, 10 | 15.62, 0.0, 10 | 29.62, 0.0, 10 |
| ARG-INIT | 2.62, 0.0, 10 | 4.65, 0.0, 10 | 7.04, 0.0, 10.0 |

FIG. 8

| METHOD | SYNTHETIC ($m = 50$) | WAVEFORM | HELOC | MNIST DIGITS |
|---|---|---|---|---|
| RANDOM | 36.04, 0.00, 200 | 0.66, 0.10, 200 | 0.36, 0.00, 200 | 1.81, 0.00, 100 |
| VAL-INIT | 16.82, 0.00, 200 | 0.32, 0.16, 200 | 0.19, 0.00, 200 | 0.77, 0.00, 100 |
| ARG-INIT | 43.17, 0.10, 200 | 0.53, 0.02, 200 | 0.30, 0.39, 200 | 1.08, 0.23, 100 |

FIG. 9

| METHOD | WAVEFORM | MNIST DIGITS |
|---|---|---|
| RANDOM | 0.31, 0.21, 200 | 3.90, 0.00, 100 |
| VAL-INIT | 0.35, 0.20, 200 | 2.16, 0.01, 100 |
| ARG-INIT | 0.33, 0.18, 200 | 1.00, 0.04, 100 |

FIG. 10

| METHOD | $n_u = 5$ | $n_u = 10$ | $n_u = 15$ |
|---|---|---|---|
| RANDOM | 0.90, 100 | 1.00, 100 | 1.05, 100 |
| VAL-INIT | 0.93, 100 | 1.06, 100 | 1.09, 100 |
| ARG-INIT | 0.93, 100 | 1.10, 100 | 1.16, 100 |

INITIALIZING OPTIMIZATION SOLVERS

BACKGROUND OF THE INVENTION

The present invention relates generally to the field of computer programing, and more particularly to initialize optimization solvers to improve the efficiency of solving problem instances.

In computer programming, initialization is the assignment of a flowchart or variable. The manner in which initialization is performed depends on programming language, as well as type, storage class, etc., of an object to be initialized. Programming constructs which perform initializations are typically called initializers and initializer lists. Initialization is distinct from (and preceded by) declaration, although the two can sometimes be conflated in practice. The complement of initialization is finalization, which is primarily used for objects, but not variables. Initialization is done either by statically embedding the value at compile time, or else by assignment at run time. A section of code that performs such initialization is generally known as "initialization code" and may include other, one-time-only, functions such as opening files; in object-oriented programming, initialization code may be part of a constructor (class method) or an initializer (instance method). Setting a memory location to hexadecimal zeroes is also sometimes known as "clearing" and is often performed by an exclusive or instruction (both operands specifying the same variable), at machine code level, since it requires no additional memory access.

Hand-designed initialization (i.e., designing initializers tailored to a specific problem class) is a common approach in deep learning and artificial intelligence (AI). For instance, in deep learning, in clustering problems, and in phase retrieval, different elegant initialization rules are proposed for the respective problem classes, which work better (e.g., more efficiently) than random initialization. However, it is impractical to develop these rules for every new optimization problem a user encounters and a more scalable strategy is highly desirable. Another approach is Learning to optimize gradient-based methods, wherein learning to optimize gradient based methods comprises: learning step update rules with fixed initialization rules. Additionally, this work learns initialization rules with fixed update rules.

SUMMARY

Embodiments of the present invention disclose a method, a computer program product, and a system for utilizing a machine learning model to solve a sequential optimization problem, the method comprising: receiving, by a computing device, a sequential optimization problem for solving; utilizing, by the computing device, a random initialization to solve a first instance of the sequential optimization problem; learning, by the computing device a machine learning model, based on a previously stored solution to the first instance of the sequential optimization problem; generating, by the computing device the machine learning model, one or more subsequent approximate solutions to the sequential optimization problem; and outputting, by a user interface on the computing device, the one or more subsequent approximate solutions to the sequential optimization problem.

BRIEF DESCRIPTION OF THE DRAWINGS

FIG. 4 is an exemplary algorithm, in accordance with an embodiment of the present invention;

FIG. 5 is an exemplary algorithm, in accordance with an embodiment of the present invention;

FIG. 6 is an exemplary algorithm, in accordance with an embodiment of the present invention;

FIG. 8 is an exemplary table, in accordance with an embodiment of the present invention;

FIG. 9 is an exemplary table, in accordance with an embodiment of the present invention;

FIG. 10 is an exemplary table, in accordance with an embodiment of the present invention;

DETAILED DESCRIPTION

Figure 1:
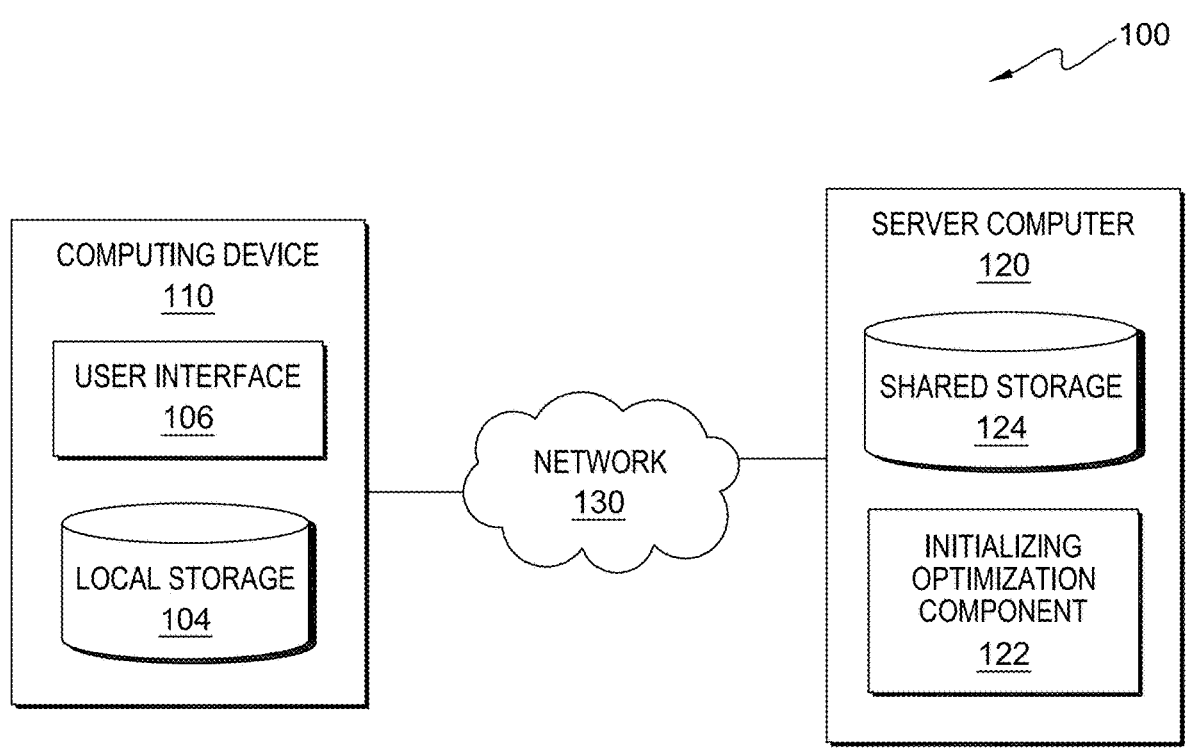
FIG. 1 is a functional block diagram illustrating a distributed data processing environment, in accordance with an embodiment of the present invention.

In many engineering and machine learning applications, embodiments of the present invention recognize a user and/or application is often required to repeatedly solve different but related optimization problems. Embodiments of the present invention recognize that sequential optimization problems require numerous computations to solve sequential optimization problems. For example, generating explanations for black-box model predictions, generating recommendations for new subjects, generating adversarial examples for different data instances, and other non-convex problems such as resource allocation and phase retrieval. Embodiments of the present invention improve the art by reducing the number of computations to solve sequential optimization problems (i.e., problem instances). Embodiments of the present invention improve the art by reduced costs of querying black-box models, reducing wait-time for subjects, and reduced energy consumption.

Embodiments of the present invention recognize that the current practice in optimization for initialization mainly involves two types of approaches: random initialization or hand-engineered initialization. The former tends to be agnostic to the problem type and the latter is tailored to suit the problem and enable fast search. Embodiments of the present invention recognize that when no hand-engineered initialization techniques are available and random initialization does not work well, it is also common to use multi-start methods. Embodiments of the present invention recognize that these methods search for a solution starting from different random initializations and select the best solution identified. Embodiments of the present invention recognize that there is a body of work in meta-learning which also follows the same principle of learning to optimize, i.e., using the past instances of the optimization to improve the current search. These works focus on learning step-update rules while using fixed initialization rules, which is different from the focus on learning initialization rules.

Embodiments of the present invention recognize that hand-engineered initialization has been successfully applied to many problems such as k-means clustering, phase retrieval, training neural networks. However, it is impractical to design a new initialization for every new problem. Instead, embodiments of the present invention take the approach of learning initialization for the respective problem class. Embodiments of the present invention recognize that random initialization is a fast problem agnostic approach; however, it can work very poorly especially in non-convex problems. Embodiments of the present invention recognize that random initialization with multiple starts (multi-start) is computationally expensive. Embodiments of the present invention overcome these limitations of random initialization (with and without multi-start).

Embodiments of the present invention recognize that one particular problem of interest is that the solution to an optimization is heavily dependent on the identity of the task at hand and initializations should take the identity of the task into account. Hence, meta-stochastic gradient decent (SGD) type approaches that do not exploit the identity of the task cannot perform well for embodiments of the present invention settings. Additionally, embodiments of the present invention recognize that non-convex optimization problems are challenging to solve, and the success of an optimization algorithm can heavily depend on the initialization strategy.

Embodiments of the present invention recognize that in many problem classes, either the initialization rules are random or are carefully designed by exploiting the nature of the problem class. In embodiments of the present invention, the focus on learning optimum initialization rules for different problem classes, wherein the optimization algorithm, described below, uses gradient descent or its variants. Optimum initialization rules identify initialization values that may lead to achieving better final performance than if the rules or values were initialized randomly. Embodiments of the present invention, generate/build initializers that exploit previous solutions. Embodiments of the present invention may comprise theoretical guarantees that establish sufficient conditions, wherein, sufficient conditions state that if a learner is correlated with solution values, then the learner will lead to better initializations than random initialization on non-convex problems. Embodiments of the present invention have been applied to various problems (e.g., generating adversarial examples, generating explanations, and other non-convex problems such as resource allocation, and show substantial gains over the standard random initialization technique) to solve these particular problems stated above. Embodiments of the present invention improve the art by leveraging the information and data gathered from repeatedly solving application problems to speed up the search and application solutions. Embodiments of the present invention improve the art by learning to initialize the search for a solution using the searches that have been previously/historically executed.

Embodiments of the present invention improve the art by enabling a scalable and adaptable strategy. Additionally, embodiments of the present invention improve the current art and are advantageous to the art by (i) providing a practical alternative to hand-designing initialization rules; (ii) providing an efficient alternative than the random initialization approach with multiple restarts; and (iii) providing gains over random initialization. For example, as detailed below, embodiments of the present invention was applied to three different applications, a) generating explanations, b) generating adversarial examples, and c) resource allocation, and show substantial gains over random initialization.

Implementation of embodiments of the invention may take a variety of forms, and exemplary implementation details are discussed subsequently with reference to the Figures (i.e., FIG. 1-FIG. 16).

FIG. 1 is a functional block diagram illustrating a distributed data processing environment, generally designated distributed data processing environment 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of user interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 16.

User interface (interface) 106 provides an interface to the initializing optimization component (optimization component) 122. Computing device 110, via user interface 106, may enable a user and/or a client to interact with optimization component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 16. In some embodiments server computer 120 may represent a plurality of server computers.

Each of shared storage 124 and local storage 104 may be a data/knowledge repository and/or a database that may be written and/or read by one or a combination of optimization component 122, server computer 120 and computing device 110. In the depicted embodiment, shared storage 124 reside on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, In the depicted embodiment, optimization component 122 is executed on server computer 120. In other embodiments, optimization component 122 may be executed on computing device 110. In various embodiments of the present invention, not depicted in FIG. 1, optimization component 122 may execute on a plurality of server computers 120 and/or on a plurality of computing devices 110. In some embodiments, optimization component 122 may be located and/or executed anywhere within distributed data processing environment 100 as long as optimization component 122 is connected to and/or communicates with computing device 110, and/or server computer 120, via network 130.

optimization component 122 may use the principle of learning from the past optimization solutions (e.g., previously stored solutions to the first and/or second instance of the sequential optimization problem) to build two approaches, wherein the two approaches comprise: (i) non-convex optimization and (ii) gradient-descent solvers. In non-convex optimization, different initialization may lead to different local minima (e.g., more generally stationary points) with different values. In various embodiments of the present invention, the first approach learns to differentiate different initial values and select initial values that lead to better minimum. Gradient-descent solvers may converge to a certain stationary point faster provided the initialization is closer to the stationary point. In the second approach, optimization component 122 may learn a map that predicts initializations that are closer to the stationary points.

Figure 7:
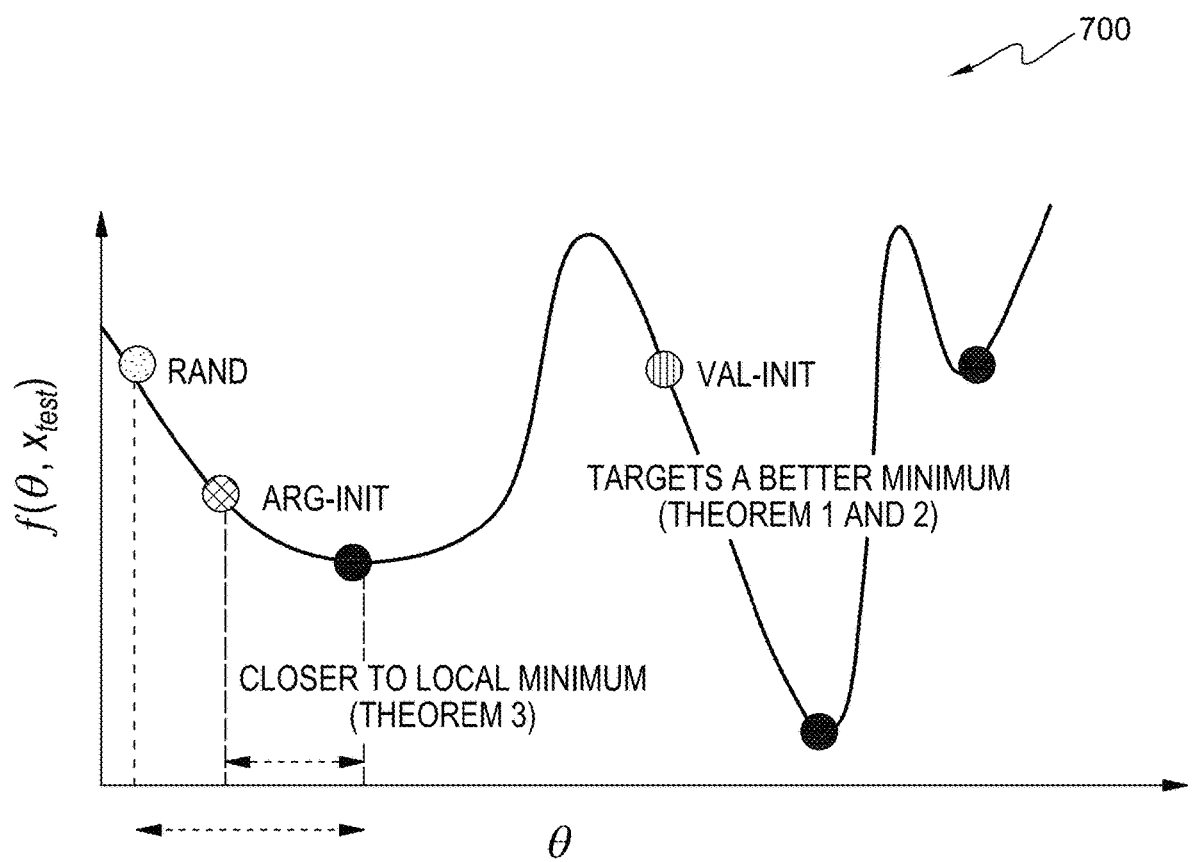
FIG. 7 is an exemplary graph, in accordance with an embodiment of the present invention.
Figure 12:
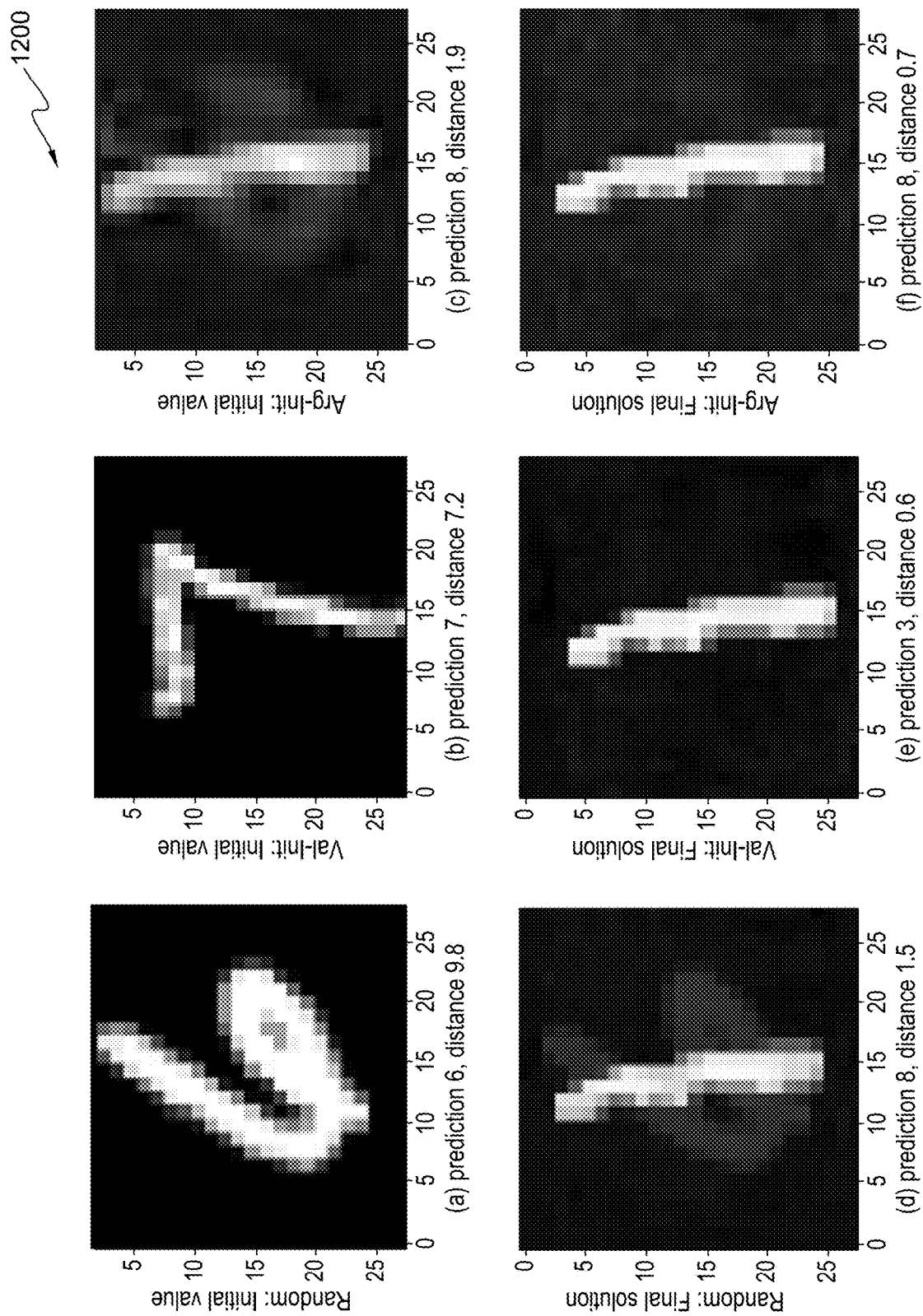
FIG. 12 is an exemplary adversarial examples, in accordance with an embodiment of the present invention.
Figure 14:
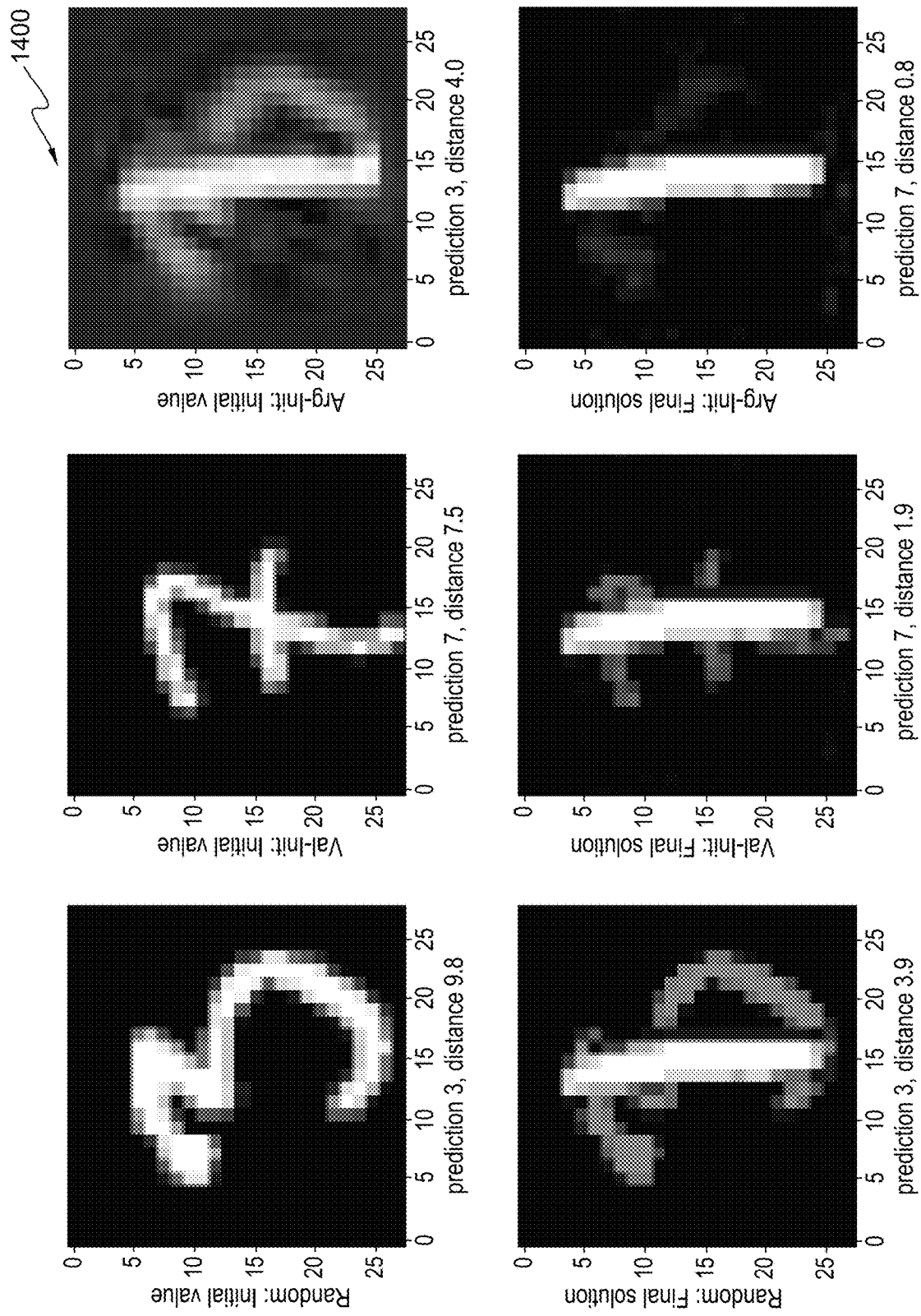
FIG. 14 is an exemplary contrastive examples, in accordance with an embodiment of the present invention.

In various embodiments of the present invention, the two approaches are each divided into two phases, wherein the first phase is identical in both the first and second approach. In the first phase, of both the first and second approach, for incoming problem instance as depicted in FIG. 12 and FIG. 14, optimization component 122 executes random initialization to solve the problem and embodiments of the present invention store the data in local storage 104 and/or shared storage 124, wherein the data comprises: the problem instance, the initialization used, and the solution obtained (argument of the solution and the objective function value). In various embodiments of the present invention, in the second phase of the first approach optimization component 122 learns one or more models that receive the problem instance and the initialization as input and output an approximate objective function value at the solution. For incoming instances, optimization component 122 may generate a set of random initial values and use the model to predict the approximate objective function values that the initial values will achieve. Optimization component 122 may identify and/or select an initial value that is predicted to achieve the best outcome, as illustrated in FIG. 7. In various embodiments of the present invention, outcome is defined as picking the initial value from the set of initial values with the best prediction. For example, in FIG. 7, the initializer identifies two values, the Rand value and the Val-Init value, wherein the initializer selects the Val-Init value as it is going to achieve a smaller local minima, located in a deeper valley. In various embodiments of the present invention, during the second phase of this approach, optimization component 122 learns a model that takes the problem instance and the initialization as input and outputs an approximation of the solution argument. For an incoming instance, optimization component 122 may generate a random initial value and use the model to predict the solution argument, which optimization component may 122 use as the initialization.

Figure 2:
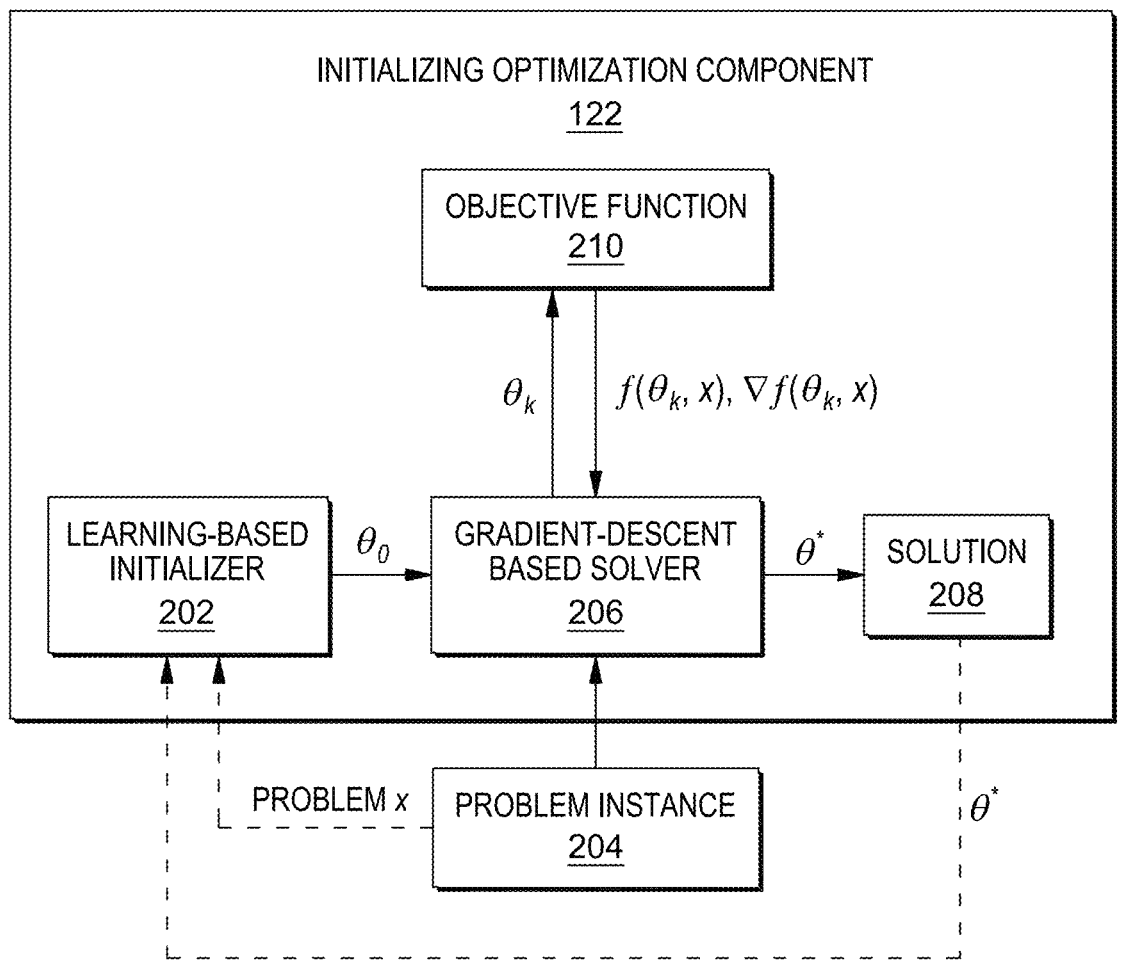
FIG. 2 illustrates a block diagram depicting an initializing optimization component, executing on a server computer, within distributed data processing environment of FIG. 1, for learning-based initialization, in accordance with an embodiment of the present invention.

FIG. 2 illustrates a block diagram depicting optimization component 122 in communication with computing device 110 and/or server computer 120, within distributed data processing environment 100 of FIG. 1, demonstrating learning-based initialization, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiments, learning-based initializer 202, gradient-decent based solver 206, and object function 210 each execute on optimization component 122. In other embodiments, not depicted in FIG. 2, learning-based initializer 202, gradient-decent based solver 206, and object function 210 execute on optimization component 122 may each be located and/or executed anywhere within distributed data processing environment 100 as long as learning-based initializer 202, gradient-decent based solver 206, and object function 210 each are connected to and/or communicate with optimization component 122, computing device 110, and/or server computer 120, via network 130.

Problem instance (problem) x arrives and is sent to both the learning based initializer 202 and gradient descent based solver 206 from problem instance 204, wherein problem x represents the current optimization problem embodiments of the present invention want to solve). Learning-based initializer generates an initialization $\theta_0$ that is sent to the gradient descent based solver 206. With initialization $\theta_0$ and the instance x as input the gradient descent based solver starts its search for the solution. The gradient descent based solver 206 sends the current solution $\theta_k$ to objective function 210, which sends back the value of the objective function $f(\theta_k, x)$ for the current proposed solution $\theta_k$ and the gradient with respect to $\theta\_k$ denoted as $\nabla f(\theta_k, x)$. Gradient descent based solver 206 uses objective function ($f(\theta_k, x)$) and gradient-descent based solver ($\nabla f(\theta_k, x)$) to propose the next solution. $\theta_{k+1}$, wherein $f(\theta_k, x)$ represents the objective function's value under current solution value $\theta_k$ for instance x and ($\nabla f(\theta_k, x)$ represents the gradient of the objective function with respect to $\theta_k$. This back and forth communicated continues until k reaches a predefined maximum iteration budget iter_max (also shown in FIG. 4). The final solution $\theta^*$ is sent to the solution 208 which stores the solution. This solution is sent back to the learning based initializer 202, which updates the learner. This completes the flow for problem x. The same procedure is repeated when a new x arrives. In various embodiments, not depicted in FIG. 2, optimization component 122, via solution 208, presents the solution to the user by displaying the solution on interface 106.

Figure 3:
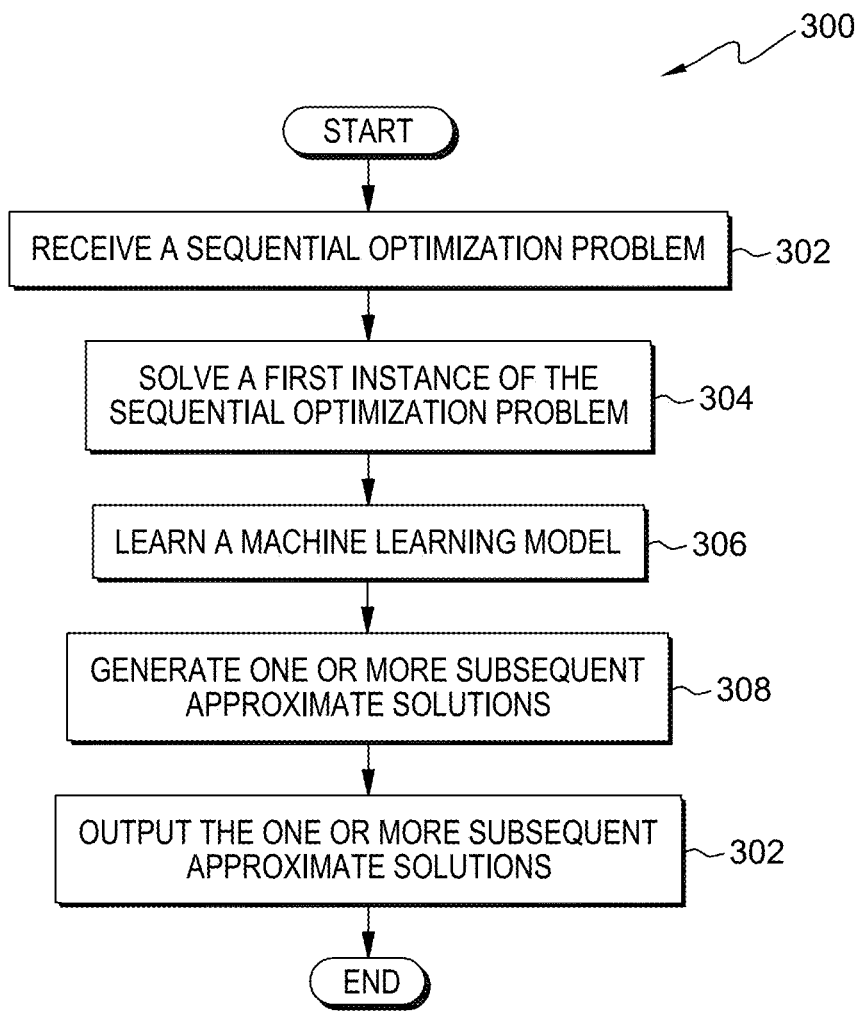
FIG. 3 illustrates operational steps of the initializing optimization component, on a server computer within the distributed data processing environment of FIG. 1, for utilizing a machine learning model to solve a sequential optimization problem, in accordance with an embodiment of the present invention.

FIG. 3 illustrates operational steps of optimization component 122, generally designated 300, in communication with computing device 110, within distributed data processing environment 100 of FIG. 1, for initializing optimization solvers, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, optimization component 122 receives a sequential optimization problem from local storage 104 and/or shared storage 124. In various embodiments of the present invention, optimization component 122 receives one or more sequential optimization problems for solving, wherein the sequential optimization problem is related to a machine learning task. Sequential optimization problems comprise problem instances. In various embodiments of the present invention, optimization component 122 receives one or more sequential optimization problems for solving, wherein the sequential optimization problem is related to training a neural network. In various embodiments of the present invention, in the first phase, optimizer component 122 executes a random initializer for N problem instances and gathers the data, wherein the data comprises: problem instances, initialization used, and solutions obtained (argument of the solution and the objective function value), further described below in FIG. 5.

In step 304, optimization component 122 solves a first instance of the sequential optimization problem. In various embodiments of the present invention, optimization component 122 utilizes a random initialization to solve a first instance of the one or more sequential optimization problems. In various embodiments of the present invention, optimization component 122 generates one or more solutions to the first instance of the one or more sequential optimization problems.

In step 306, optimization component 122 learns a machine learning model. In various embodiments of the present invention, optimization component 122 learns a machine learning model based upon one or more solution to the first instance of the one or more sequential optimization problems. In various embodiments of the present invention, the focus in learning initialization rules for different problem classes, where the optimization algorithm uses gradient descent or its variants. In various embodiments of the present invention, in the second phase of the first approach optimization component 122 learns a map from instance, initialization to objective value, generate M random initializations and use the map to predict the best initialization and use the predicted initialization as the initialization, as further described in FIG. 5. In various embodiments of the present invention, in the second phase of the second approach optimization component 122 learns a map from instance, initialization to argument value, generates one random initialization and uses the map to generate a new initialization, as further described in FIG. 6.

In step 308, optimization component 122 generates one or more subsequent approximate solutions. In various embodiments of the present invention, optimization component 122 utilizes the machine learning model to generate one or more subsequent approximate solutions to the sequential optimization problem. In various embodiments of the present invention, optimization component 122 stores the generated one or more subsequent approximate solutions to local storage 104 and/or shared storage 124.

In step 310, optimization component 122 outputs the one or more subsequent approximate solutions. In various embodiments to the present invention, optimization component 122 outputs the one or more subsequent approximate solutions to the user, via interface 106. In some embodiments of the present invention, optimization component 122 implements and/or executes the one or more subsequent approximate solutions to the one or more sequential optimization problems. In some embodiments of the present invention, when the one or more subsequent approximate solutions are output and displayed to a user the one or more subsequent approximate solutions provide step by step instructions to the user on how to implement the solution. In other embodiments, responsive to the user accepting a generated display prompt in interface 106 confirming the generated one or more subsequent approximate solutions, optimization component 122 automatically applies the one or more subsequent approximate solutions to the sequential optimization problem.

Some embodiments of the present invention recognize the following facts, potential problems, and/or potential areas for improvement with respect to the current state of the art.

In many machine learning and engineering tasks, some embodiments of the present invention are of—ten required to solve optimization problems repeatedly. For instance, a system that generates explanations for black-box machine learning models needs to solve a new optimization problem for every new prediction made; a recommender system solves a different optimization problem every time a new subject arrives. As is typically the case, the optimization problems for each instance are solved independently. However, if embodiments of the present invention learned optimum initializations for many of the instances based on previous solutions, it could lead to significant savings in time, money, and energy, where function and gradient evaluation has an associated cost and carbon footprint.

For the optimization problems some embodiments of the present invention often encounter are non-convex, and initialization plays a crucial rule in finding an optimum local minimum (more generally a stationary point). In non-convex optimization, many solvers used random initializations and then using the best solution. In this work, some embodiments of the present invention develop methods that learn to initialize based on past knowledge.

Embodiments of the present invention consider a system that is required to solve different (but related) minimization problems sequentially. Some embodiments of the present invention assume that each minimization problem's objective is continuously differentiable and is possibly non-convex. Embodiments of the present invention use a solver that follows a gradient-based approach to find the solution. Embodiments of the present invention propose two approaches to learn initialization rules. In the first approach, some embodiments of the present invention start by learning a map from the problem instance and the initialization to an approximate objective function value at the solution. Some embodiments of the present invention use this mapping to select a "optimum" initialization from a set of random initial values without actually running the method on all the values in the set, unlike a multiple start based approach. Some embodiments of the present invention prove if the learned map has low prediction error, some embodiments of the present invention achieve lower objective value than random initialization and close to multiple random initialization approach for non-convex problems.

In the second approach, embodiments of the present invention first learn a mapping from the problem instance and the initialization values to an approximation of the final optimization variable found by the solver. Some embodiments of the present invention use this mapping to predict a new initialization from a given random initialization. Some embodiments of the present invention prove if the learned map has low prediction error, then in embodiments of the present invention the initialization is closer to the stationary point than the random initialization.

Some embodiments of the present invention carry out experiments on real and synthetic datasets for some embodiments of the present invention work with the following problems: generating adversarial examples, generating explanations for model predictions, and resource allocation. Some embodiments of the present invention show substantial gains (up to 50 percent for adversarial examples on modified national institute of standards and technology database MNIST) are achieved by embodiments of the present invention, i.e., for the same number of gradient computations embodiments of the present invention achieves much lower objective values than random initialization.

In recent years, several works have explored data-driven design of optimization algorithms for training machine learning models moving away from expert-driven design. These works are inspired from the long line of works in meta-learning (learning to learn). Gradient descent based algorithms typically consist of two blocks: initialization and step updates (update direction, and learning rates). These works primarily focus on learning step updates instead of following standard rule based approaches. In some embodiments of the present invention, the learning to optimize literature has mainly dealt with step updates for gradient descent and not initializations.

Hand-designed initialization, i.e., designing initializers tailored to a specific problem class, is a common approach. For instance, in deep learning, in clustering problems, and in phase retrieval, different elegant initialization rules were proposed for the respective problem classes, which work better than random initialization. However, it is impractical to develop these rules for every new optimization problem some embodiments of the present invention encounter and a more scalable strategy is highly desirable. Some embodiments of the present invention is one such scalable and adaptable strategy.

Some embodiments of the present invention are given an objective function $f: \mathbb{R}^m \times \mathbb{R}^n \to \mathbb{R}$ to be minimized. The input to the function is divided in two categories: $\theta \in \mathbb{R}^m$ are the set of variables to be optimized and $x \in \mathbb{R}^n$ are a fixed set of parameters that specify the problem instance. The minimization problem is given as:

$$\min_{\theta \in \Theta} f(\theta, x), \quad (1)$$

where $\Theta \subseteq \mathbb{R}^m$ is the set in which the search is constrained.

With respect to problem (1) some embodiments of the present invention assume that the function $f$ is continuously differentiable. Define $\Pi_\Theta$ as the projection operator, which projects the input on $\Theta$ (finds the closest point in $\Theta$, where the distance is measured in terms of a specified norm). Some embodiments of the present invention assume $\Pi_\Theta$ is cheap to compute (see such examples for both convex sets and non-convex sets $\Theta$). Some embodiments of the present invention use a standard gradient descent based approach, utilizing Algorithm 1, as detailed in FIG. 4, to solve problem (1). First a step is taken in the direction of the gradient. The new point obtained is projected onto the set $\Theta$. The step size $\{t_k\}_{k=0}^\infty$ rules are also given as input to the algorithm.

Some embodiments of the present invention refer to the algorithm as GD, it takes as input the function to be optimized say g, and gives as output the arguments found $f^\dagger$, and the value of the objective $g^\dagger$.

Some embodiments of the present invention are presented a sequence of instances $\{x_i\}_{i=1}^\infty$, drawn independent and identically distributed (i.i.d.) from $\mathbb{P}_X$. The sequence of functions corresponding to these instances are $\mathbb{R}$, where $f_i = f(\bullet, x_i)$ is a function of $\theta$ for a fixed $x_i$. Some embodiments of the present invention solve problem (1) repeatedly for $\mathbb{R}$. Observe that some embodiments of the present invention can use the information that some embodiments of the present invention acquire from solving the optimization for the different instances in the past for improving the current search. In the next section, some embodiments of the present invention give some motivating examples of non-convex optimization in machine learning and engineering.

Machine learning applications: generating adversarial examples, generating instance-wise explanations. Consider the problem of binary classification with two classes (e.g., 1 and −1). Some embodiments of the present invention are given a model g: $\mathbb{R}^d \to \mathbb{R}$ that predicts the score that for an instance. Some embodiments of the present invention convert these scores into predicted labels y for each instance x as follows. y=1 if g(x)≥0 and y=−1 otherwise. Consider the following optimization problem.

$$\min_{\theta \in \Theta} \|\theta\|^2 + \beta\|\theta\|_1 \quad (2)$$
$$\text{s.t. } y(g(x + \theta)) \le 0$$

In the above problem (2), if some embodiments of the present invention set β=0 and $\Theta = \mathbb{R}^d$, then the problem is the same as finding adversarial attacks for model g. θ is the smallest perturbation (attack) that moves x to the other side of the boundary g(z)=0. If g is a deep neural network, then the above problem is non-convex, and it is non-trivial to find the global optimum tractably. There is a lot of interest in understanding whether an adversary can generate attacks with very few queries to the model and its gradients. By exploiting the knowledge from the past adversarial instances, some embodiments of the present invention show that the adversary can generate optimum adversarial examples with much fewer queries to the model than random initialization.

If β>0 and the set Θ is constrained to a special non-convex set of what is referred to as "pertinent negatives", the above problem (2) is equivalent to finding instance-wise model explanations in the form of pertinent negatives. For a system that generates explanations for predictions made to its clients on a repeated instance to instance basis, it is important to generate these explanations fast both because it is computationally expensive and also because each query to a black-box model deployed on some other company's cloud has an associated cost.

In a communication system, when there are many users transmitting signals in the same spectrum they interfere with each other. Therefore, a base station needs to decide how these users transmitting signals share the resource, which is the spectrum. Consider a system with N transmitters and N receivers in a system. Each user $i$, transmits at a power level $p_i \in [0, 1]$. The channel strength for user $i$ to the receiver j is $g_{ij} \in [0, 1]$. The rate at which user i's data is transmitted to receiver j is given as $$r_i(p, G) = \log\left(1 + \frac{g_{ii}p_i}{1 + \sum_{j \ne i} g_{ii}p_j}\right),$$

where p=[$p_1, \ldots, p_N$] is the power vector, G[$i$,j]=$g_{ij}$ is the channel matrix. The goal is to solve for p such that $$\max_{0 \le p \le 1} \sum_i r_i(p, G) \quad (3)$$

The above problem is non-convex and NP-hard. Therefore, it can be quite non-trivial to find the global optimum tractably. In reality, the channel matrix G is not fixed and keeps changing. As a result, the problem needs to be solved repeatedly, which makes learning initialization really important.

Before some embodiments of the present invention describe the two approaches, some embodiments of the present invention describe the random initializer. The random sampler, which some embodiments of the present invention refer to as Rand, generates a random initialization from Θ, where the distribution over the initializations is $\mathbb{P}_\Theta$. Each new initialization is an independent draw from $\mathbb{P}_\Theta$.

This approach consists of two phases. In the first phase, some embodiments of the present invention find the solution for each incoming instance $x_i$ using random initialization from Rand for the first N instances. Some embodiments of the present invention learn a model $h_{val}: \mathbb{R}^m \times \mathbb{R}^n \times \mathbb{R}$ that maps the instance x and the initialization $\theta_0$ to the value of the solution $\theta^\dagger$. In the second phase, some embodiments of the present invention use the learned model $h_{val}$ to find the initializations. For each incoming instance, generate M random initializations from Rand, compute the predicted value of the final solution using $h_{val}$ and select the initialization with lowest predicted value. Basically, $h_{val}$ predicts the best initialization among the ones proposed. Some embodiments of the present invention provide the algorithmic description in Algorithm 2, as detailed in FIG. 5; some embodiments of the present invention refer to the approach as Val-Init as it uses objective values to initialize.

This approach also consists of the two phases. The first phase of this approach is identical to the approach in Algorithm 2, as described in FIG. 5; some embodiments of the present invention collect data in this phase using random initializations. In the second phase, some embodiments of the present invention learn a model $h_{arg}: \mathbb{R}^m \times \mathbb{R}^n \to \mathbb{R}^m$ that maps the initialization $\theta_0$ and the instance x to the argument of the solution $\theta^\dagger$. In the second phase, for each instance some embodiments of the present invention start with a random initialization and input it to the learned model $h_{arg}$ to generate the initialization that is used. Some embodiments of the present invention provide the algorithmic description in Algorithm 3, as detailed in FIG. 6; some embodiments of the present invention refer to this approach as Arg-Init as it uses solution arguments to initialize.

In this section, some embodiments of the present invention analyze the two Algorithms that some embodiments of the present invention proposed in the previous section (i.e., Algorithms 2 and 3). In both the approaches, in the first phase some embodiments of the present invention use the random initializer Rand. The sequence of the tuples of initializer and the problem instance is given as $\{\theta_0^i, x_i\}_{i=1}^N$ and it is drawn i.i.d. from $\mathbb{P}_\Theta \times \mathbb{P}_X$.

Recall the only assumption some embodiments of the present invention made on $f$ in the previous section was that it is continuously differentiable so that some embodiments of the present invention can use gradient descent as the solver. Some embodiments of the present invention make some further mild assumptions on the function $f$ for analyzing the performance of Val-Init (Algorithm 2) and Arg-Init (Algorithm 3). Some embodiments of the present invention focus on an unconstrained minimization problem, i.e. $\Theta = \mathbb{R}^m$. For each problem instance x, some embodiments of the present invention assume that a global minimum exists and is attained in $\Theta$ and the gradient of the function $f(\cdot, x)$ w.r.t. $\theta$ is Lipschitz continuous in $\theta$.

Stationary point $\theta$ is a stationary point of $f(\cdot, x)$ if $\nabla_\theta f(\theta, x)=0$.

If the assumptions on the function $f$ hold and if the solver in Algorithm 1 GD uses step sizes $\{t_k\}_{k=0}^\infty$ that satisfy the Wolfe conditions, then GD is always guaranteed to find a stationary point. In the above un-constrained minimization, the global minimum is a local minimum (follows from the assumption that the global minimum is attained in $\Theta = \mathbb{R}^m$) and each local minimum is a stationary point (follows from $f(\cdot, x)$ being differentiable). For each x, some embodiments of the present invention define the set of stationary points $\theta$ as $S_x = \{\theta \in \mathbb{R}^n | \nabla_\theta f(\theta, x)=0\}$. Some embodiments of the present invention assume that the function $f(\cdot, x)$ has a finite number of stationary points for each $x \in \mathbb{R}^n$, i.e. $|S_x|<\infty$. The solver GD in Algorithm 1 can reach different stationary points depending on the initialization $\theta_0$. Some embodiments of the present invention define a function $\phi: \mathbb{R}^m \times \mathbb{R}^n \to \mathbb{R}$, which maps the intitialization $\theta_0$ and the problem instance x to the function value achieved at the stationary point found by GD. Also, define a function $\phi^\dagger: \mathbb{R}^m \times \mathbb{R}^n \to \mathbb{R}^m$, which maps the initialization $\theta_0$ and the problem instance x to the stationary point $\theta$ found by GD. Therefore, for each $\theta_0 \in \mathbb{R}_m \exists \theta \in S_x$ such that $\phi(\theta_0, x)=f(\theta, x)$ and $\phi^\dagger(\theta_0, x)=\theta$. Some embodiments of the present invention assumed $S_x$ is a finite set. Therefore, $\phi(\cdot, x)$ only takes finitely many distinct values and thus is a piecewise constant function for a fixed x. Observe that $h_{val}$ in Val-Init and harg in Arg-Init try to learn $\phi$ and $\phi^\dagger$.

Some embodiments of the present invention now construct the inverse mapping of $\phi$ for a fixed x, which some embodiments of the present invention represent as $\phi_x^{-1}$. If $y=f(\theta, x)$, where $\theta \in S_x$, then $\phi_x^{-1}$ maps to all the initialization values that will achieve y if input to Algorithm 1. If y cannot be achieved by the Algorithm from any initialization, then the inverse maps to an empty set. For any other y that is not the value at a stationary point, $\phi_x^{-1}$ also maps to an empty set. $\phi_x^{-1}$ partitions the initialization space into different regions which lead to the same final stationary point.

Val-Init for convex vs non-convex minimization. $S_x$ is the set of stationary points for instance x. Define another set $\tilde{S}_x$ corresponding to the distinct function values at the stationary points, i.e. $\tilde{S}_x=\{y|y=f(\theta, x), \theta \in S_x\}$. Some embodiments of the present invention discuss two possibilities. Suppose $\tilde{S}_x$ has one value, e.g. if $f(\cdot, x)$ is a convex function in $\theta$, then no matter where some embodiments of the present invention initialize, the function value at the solution is the same. In such problem instances, it is not meaningful to use Val-Init (Algorithm 2). However, if $\tilde{S}_x$ consists of at least two distinct values, then using Val-Init to compare initializations is meaningful. If $f(\cdot, x)$ is not a convex function in $\theta$ and has multiple local minima, then some embodiments of the present invention should use Val-Init (Algorithm 2).

Some embodiments of the present invention summarize the assumptions that some embodiments of the present invention made so far.

Assumption 1 For each $x \in \mathbb{R}^n$, $f(\cdot, x)$ is continuously differentiable, the global minima exists, gradient is Lipschitz continuous.

Assumption 2 The search set $\Theta = \mathbb{R}^m$.

Assumption 3 The GD solver in Algorithm 1 uses steps that follow Wolfe conditions and is run until convergence to a stationary point.

Assumption 4 For the problem instance x under consideration, $|S_x|<\infty$, $\exists \theta_i$, $\theta_j \in S_x$, where $f(\theta_i, x) \neq f(\theta_j, x) \cdot \exists \Delta > 0$ s.t. when $\theta_i$, $\theta_j$ have distinct function values $f(\theta_i, x) \neq f(\theta_j, x)$ then $|f(\theta_i, x) - f(\theta_j, x)| > \Delta$.

For Assumptions 5-7 to follow, some embodiments of the present invention require Assumptions 1-4 to hold.

Assumption 5 For the problem instance x under consideration, the random sampler samples initializations such that it discovers at least two stationary points with distinct function values with probability one.

The above assumption only requires that the random sampler not generate initializations that lead to the same stationary point all the time; some embodiments of the present invention do not need it to achieve all stationary points. In the next assumption, some embodiments of the present invention state that $h_{val}$ has a low generalization error with respect to (w.r.t.) $\phi$ (in each region that the random sampler finds with a non-zero probability).

Assumption 6 For the problem instance x under consideration the following condition holds. For each y which satisfies $$\mathbb{P}_\theta(\phi_x^{-1}(y))) > 0,$$

$$\mathbb{E}_{\mathbb{P}_\theta}[|\phi(\theta_0, x) - h_{val}(\theta_0, x)|^2 | \theta_0 \in \phi_x^{-1}(y)] \le \frac{\Delta^2 \zeta}{4} \text{ where } 0 < \zeta < (1 - \frac{1}{\sqrt{2}}).$$

Validity of Assumptions: Assumption 1 is a standard condition in optimization literature to ensure convergence of gradient based algorithms. Consider the unconstrained version of (2) given as $f(\theta, x)=\|\theta\|+yg(x+0)$. Suppose g( ) is a multilayer perceptron with sigmoid activation functions. This function $f$ satisfies Assumption 1 (due to smooth, bounded gradients of sigmoid). Regarding Assumption 4, some embodiments of the present invention extend the results to the scenario when number of stationary points are not finite; which is discussed in the supplement. In the theorem to follow, some embodiments of the present invention compare some embodiments of the present invention with random initialization. Some embodiments of the present invention can think of the two methods as two policies. In multi-armed bandits, when some embodiments of the present invention compare two policies some embodiments of the present invention encounter assumptions similar to Assumption 6. For instance, a simple greedy policy that selects the arm with highest estimated reward performs better than a random policy when the error in reward estimates is low. For us Assumption 6 also ensures something similar. The remaining Assumptions 2, 3 and 5 are also pretty standard and non-restrictive. This leads us to the main result.

Theorem 1 For a given problem instance x, if Assumptions 1-6 hold, then the output of Val-Init (Algorithm 2), i.e., $\theta_0^{val}$ performs better than random initialization $\theta_0^{rand}$:

$$\mathbb{E}_{\mathbb{P}_\theta}[\phi(\theta_0^{val},x)] < \mathbb{E}_{\mathbb{P}_\theta}[(\theta_0^{rand},x)]$$

The proofs to all the theorems are in the supplement. Some embodiments of the present invention now do a comparison with multiple random initialization with M restarts. This method searches for the global op-timum by doing M executions of the solver GD from Algorithm 1. Note that this method is doing an exhaustive search over multiple initializations; thus, it is bound to be at least as efficient as some embodiments of the present invention and better than a method with one initialization. However, this method's computational complexity is almost M times larger than each run of some embodiments of the present invention in the second phase. Therefore, the goal is to show that some embodiments of the present invention can be close to this method with multiple restarts. For the next result, some embodiments of the present invention strengthen Assumption 6.

Assumption 7 For the problem instance x under consideration the following condition holds. For each y which satisfies $$\mathbb{P}_\theta(\phi_x^{-1}(y)) > 0,$$

$$\mathbb{E}\left[|\phi(\theta, x) - h_{val}(\theta, x)|^2 \big| \theta \in \phi_x^{-1}(y)\right] \le \frac{\Delta^2 \varsigma}{4} \text{ where } 0 < \varsigma < \frac{\tilde{\epsilon}}{2y^{sup}}$$

and $y_{sup}$ is the upper bound on the values of the objective at the stationary points and $\tilde{\epsilon} > 0$ is any small positive quantity.

Theorem 2 If Assumptions 1-5, Assumption 7 hold, then the output of Val-Init (Algorithm 2) $\theta_0^{val}$ performs almost as well as multiple random initialization $\{\theta_0^{rand,m}\}_{m=1}^M$:

$$\mathbb{E}_{\mathbb{P}_\theta}\left[\phi(\theta_0^{val}, x)\right] \le \mathbb{E}_{\mathbb{P}_\theta}\left[\min_{m \in \{1,\ldots,M\}} \left(\phi(\theta_0^{rand,m}, x)\right)\right] + \tilde{\epsilon}$$

where $\tilde{\epsilon}$ defined in Assumption 7 can be set to any small positive value to control the approximation error.

Algorithm 3 predicts an initialization, which it hopes is closer to the stationary point as that can lead to faster con-vergence. Some embodiments of the present invention state this condition as an event $\|h_{arg}(\theta_0, x) - \phi^\dagger(\theta_0, x)\| \le \eta \|\theta_0 - \phi^\dagger(\theta_0, x)\|$, where $\eta < 1$ and some embodiments of the present invention call this event "n-factor reduction".

Assumption 8 For any x and any $\epsilon > 0$, $\exists$ a small $B_\kappa(\phi^\dagger(\theta_0, x)) = \{\theta \| \|\theta - \phi^\dagger(\theta_0, x)\| \le \kappa\}\}$ with radius $\kappa$ such that $\mathbb{P}_\theta(\theta \in B_\kappa(\phi^\dagger(\theta_0, x))) \le \epsilon$.

The above assumption requires the distribution $\mathbb{P}_\theta$ to have support over entire $\Theta$ and the continuous cumulative distribution function of $\theta$ to be continuous.

Theorem 3 If Assumption 1-3 and 8 hold, then the following statement is true. Given $\epsilon > 0$, select a $\kappa$ such that Assumption 8 holds. If the generalization error of $h_{arg}$ is sufficiently small, i.e. for an s>0 and $0 < \eta < 1$, $\mathbb{E}_{\mathbb{P}_\theta \times \mathbb{P}_X}[\|h_{arg}(\theta_0, x) - \phi^\dagger(\theta_0, x)\|^2] \le s(1-\epsilon)(\kappa \eta)^2$, then with probability $(1-s)(1-\epsilon)$, the output of the Arg-Init (Algorithm 3) achieves $\eta$-factor reduction.

In the supplement, some embodiments of the present invention prove scenarios when $\eta$ factor reduction translates to reduction in iterations. In FIG. 7, some embodiments of the present invention compare Val-Init and Arg-Init with random initialization.

In this section, some embodiments of the present invention solve various optimization problems: generating adversarial examples, generating contrastive explanations and sum-rate maximization. Some embodiments of the present invention use gradient descent based methods to solve these problems. Some embodiments of the present invention compare the initialization methods with random initialization. Keeping the number of iterations in the gradient descent method the same across the different initialization methods, some embodiments of the present invention compare the value of the objective function.

For simplicity, some embodiments of the present invention use the same architectures for learning a mapping from problem instance to the optimal solution (optimal argument) across the different experiments. In Tables 1-3, each entry is a tuple of three values: the average value of the objective across instances, the fraction of instances when the constraints in the optimization are not satisfied, and the number of iterations per instance.

Consider the problem in (2), some embodiments of the present invention set $\beta=1$. Some embodiments of the present invention set g to be a linear classifier $g(x)=a^t x$, where $a \in \mathbb{R}^m$ and $x \in \mathbb{R}^m$ are the parameters that are fixed for an instance of the optimization. Some embodiments of the present invention keep the classifier fixed a (a random normal vector) and vary the input example x across problem instances (each new instance x is also a random normal vector). Some embodiments of the present invention solve for the optimal perturbation $\delta$.

Some embodiments of the present invention use the projected subgradient method to solve the problem and some embodiments of the present invention let each method run for 10 iterations. Before some embodiments of the present invention describe the comparison it is important to recall that the Val-Init (Algorithm 2) is not suited for convex optimization problems as described earlier and some embodiments of the present invention only compare with the Arg-Init algorithm. In the first phase, i.e., the learning phase of the Arg-Init Algorithm, some embodiments of the present invention provide 1500 problem instances. Some embodiments of the present invention follow it with the phase, where some embodiments of the present invention provide 500 problem instances and compare the method with random initializations. In Table 1, some embodiments of the present invention compare the different approaches for three scenarios, dimensionality of feature vector m is small (5), moderate (25) and large (50). Some embodiments of the present invention compare the methods in terms of the average value of the objective function across the test instances (the best method should have the smallest value). In the same number of iterations, Arg-Init is able to find a much better solution (35-70% reduction).

For the rest of the section, some embodiments of the present invention will look at non-convex problems. Some embodiments of the present invention will study three problems: a) generating adversarial examples, b) generating contrastive explanations, and c) maximizing sum-rate in wireless networks.

If some embodiments of the present invention set $\beta=0$ in the problem in (2), some embodiments of the present invention obtain the problem that is the same as finding the adversarial example for a binary classifier. Some embodiments of the present invention choose g as a randomly initialized two layer neural network with ReLU activation in the first layer. The first layer has 50 hidden nodes and the second layer, i.e. the output layer has one output node quantifying the probability that the input has a label of 1 or 0. The output is the score for an input instance x∈Rm. Each instance x is a standard normal vector. Since g is a neural network, this makes the problem in (2) non-convex as the set of constraints define a non-convex set. There are different methods that can be used here, a) projection based methods, b) penalty based methods. Some embodiments of the present invention explore the projection based approach for this setup and later some embodiments of the present invention explore the penalty based approaches.

Some embodiments of the present invention train the models using 5000 data points. Some embodiments of the present invention test some embodiments on 500 data points and present the average value of the objective. Some embodiments of the present invention show the comparison for the case when m=50 in Table 2, depicted in FIG. 9, (other comparisons for the synthetic setting are in the supplement). Val-Init algorithm beats all the methods. Arg-init algorithm does not perform well because the model some embodiments of the present invention used for Arg-Init was not able to learn an optimum mapping, which could be improved with better architectures unless the true mapping itself is very non-trivial to learn.

In this section, some embodiments of the present invention generate adversarial examples for models trained on real datasets (2 tabular and one image dataset). There are different ways to generate random initializations. Some embodiments of the present invention found that using standard normal/uniform in general was not an optimal strategy. Instead, some embodiments of the present invention found that using random examples from the training dataset itself was more helpful. 5 Some embodiments of the present invention use the penalty based approach to generate adversarial examples.

HELOC data. Some embodiments of the present invention use home equity line of credit (HELOC) to learn a model that uses the information about the applicant in their credit report to predict whether they will make timely payments over a 2-year period. Some embodiments of the present invention divided the data into (75 percent) training and (25 percent) testing. Some embodiments of the present invention trained a 2 layer neural network using the training data, the model has a 72 percent accuracy. Some embodiments of the present invention also used the training data to learn the models for Algorithm 2 and 3. In Table 2, depicted in FIG. 9, some embodiments of the present invention show the comparison of the different methods. Val-Init performs much better than the other methods (47% reduction).

Some embodiments of the present invention use the objective defined to compute contrastive explanation (pertinent positives (PP) and pertinent negatives (PN)) for each incoming data in-stance. Some embodiments of the present invention focus on generating the PNs for all the points in the testing data. PNs may not always exist, which makes this setup more challenging. Some embodiments of the present invention compare the performance with random initialization. Some embodiments of the present invention compare the performance on MNIST digits dataset and Waveform dataset (for the same models from the previous section). There were no PNs found for the HELOC dataset, which is why no comparisons were possible.

In Table 3, depicted in FIG. 10, some embodiments of the present invention compare the different approaches in terms of the success in generating effective contrastive explanations. On MNIST digits, both Val-Init and Arg-Init are very effective in generating contrastive explanations (46% reduction). On Waveform dataset, only Arg-Init is more effective in generating contrastive explanations.

In this section, some embodiments of the present invention further investigate the comparisons for adversarial examples on MNIST dataset. In Table 2 some embodiments of the present invention compared the average performance across problem instances and found that some embodiments of the present invention help in solving the problems stated above. Some embodiments of the present invention compare the distribution of the distance from the original image in FIG. 11. Val-Init approach stochastically dominates the performance of the random initialization based approach in terms of the distance of the image from the original solution while ensuring that the solutions generated satisfy the constraint, i.e. each example is classified differently from the original image. In FIG. 12, some embodiments of the present invention compare the quality of the solution generated by the three approaches. The final solutions that are generated all satisfy the constraint that they are classified from a different class than the original class 1. The solution generated from some embodiments of the present invention is visually indistinguishable from class 1, while that is not the case for the solution generated from random approach In FIG. 12, some embodiments of the present invention also show the initial values used by the three approaches. Some embodiments of the present invention begins from points that easily morph into one.

In Table 3, as described in FIG. 10, some embodiments of the present invention compared the average performance across problem instances and found that some embodiments of the present invention can significantly help in generating PNs. Some embodiments of the present invention compare the distribution of the distance from the image of the problem instance in FIG. 13. Both Val-Init and Arg-Init approach stochastically dominates the performance of the random initialization in terms of the distance of the image from the original solution while ensuring that the solutions generated satisfy the constraint, i.e. each example is classified differently from the original image and is also a valid PN. In FIG. 14, some embodiments of the present invention compare the quality of the solution generated by the three approaches. The final solutions that are generated all satisfy the constraint that they are classified from a different class than the original class 1. The solution generated from some embodiments of the present invention are sparser and thus better pertinent negatives. Some embodiments of the present invention found this to be the case across many examples (refer to the Jupyter notebooks attached). In FIG. 14, some embodiments of the present invention also show the initial values used. some embodiments of the present invention start from points that easily morph into one.

Some embodiments of the present invention compare some embodiments of the present invention to a random initializer to solve the sum-rate maximization problem (described in (3)) using gradient ascent. Some embodiments of the present invention train using 5000 problem instances for three different settings 5,10,15 users. Each problem instance is a new independent draw of the channel matrix from a standard uniform random distribution (each element in the matrix is i.i.d.). Some embodiments of the present invention learn models for Algorithm 2 and 3 (details in supplement). Some embodiments of the present invention test on the 500 instances; see Table 4, as described in FIG. 15, for comparisons (higher values of objectives are better). Arg-Init beats all methods (10.4% gain).

In optimization solvers that use gradient descent, initialization is crucial (especially in non-convex problems) to finding "optimum" local minima. Therefore, it is a common practice to hand-engineer initialization rules. In this work, some embodiments of the present invention developed approaches that learn how to initialize for the input problem class. Some embodiments of the present invention proposed two solutions: the first approach learns to discriminate different initial values and selects the best and the second approach uses an initial value to create another initial value that is closer to the local minima. Some embodiments of the present invention carried out experiments on several datasets (real and synthetic) on a variety of optimization problems (con-vex and non-convex) and showed substantial gains (better objective values with same number of gradient evaluations).

FIG. 4 contains exemplary algorithm 400, in accordance with an embodiment of the present invention. Exemplary algorithm 400 illustrates an algorithm detailing the gradient descent algorithm, as detailed above.

FIG. 5 contains exemplary algorithm 500, in accordance with an embodiment of the present invention. Exemplary algorithm 500 illustrates an algorithm detailing the learning of values to initialize (Val-Init) algorithm, as detailed above.

FIG. 6 contains exemplary algorithm 600, in accordance with an embodiment of the present invention. Exemplary algorithm 600 illustrates an algorithm detailing the learning of arguments to initialize (Arg-Init) algorithm, as detailed above.

FIG. 7 contains exemplary graph 700, in accordance with an embodiment of the present invention. Exemplary graph 700 details an exemplary graph comparing the Val-Init Algorithm, Arg-Init Algorithm and random initialization.

FIG. 8 contains exemplary table 800, in accordance with an embodiment of the present invention. Exemplary table 800 contains an exemplary table containing 3 datasets from vector m depicting convex optimization setting, wherein the objective's average value, fraction of instances when constraints not satisfied and the number of iterations per instance are in the test phase.

FIG. 9 contains exemplary table 900, in accordance with an embodiment of the present invention. Exemplary table 900 contains an exemplary table containing 4 datasets synthetic, waveform, HELOC, and MNIST digits comparing a random, Val-Init, Arg-Init, methods. FIG. 9 depicts adversarial examples in real datasets, wherein the objective's average value, fraction of instances when constraints not satisfied in testing phase for different and the number of iterations per instance are in the test phase.

FIG. 10 contains exemplary table 1000, in accordance with an embodiment of the present invention. Exemplary table 1000 contains an exemplary table containing two datasets contrasting random, Val-Init, Arg-Init, methods against waveform and MNIST digits. FIG. 9 depicts contrastive explanations comparison, wherein the objective's average value, fraction of instances when constraints not satisfied and the number of iterations per instance are in the test phase.

Figure 11:
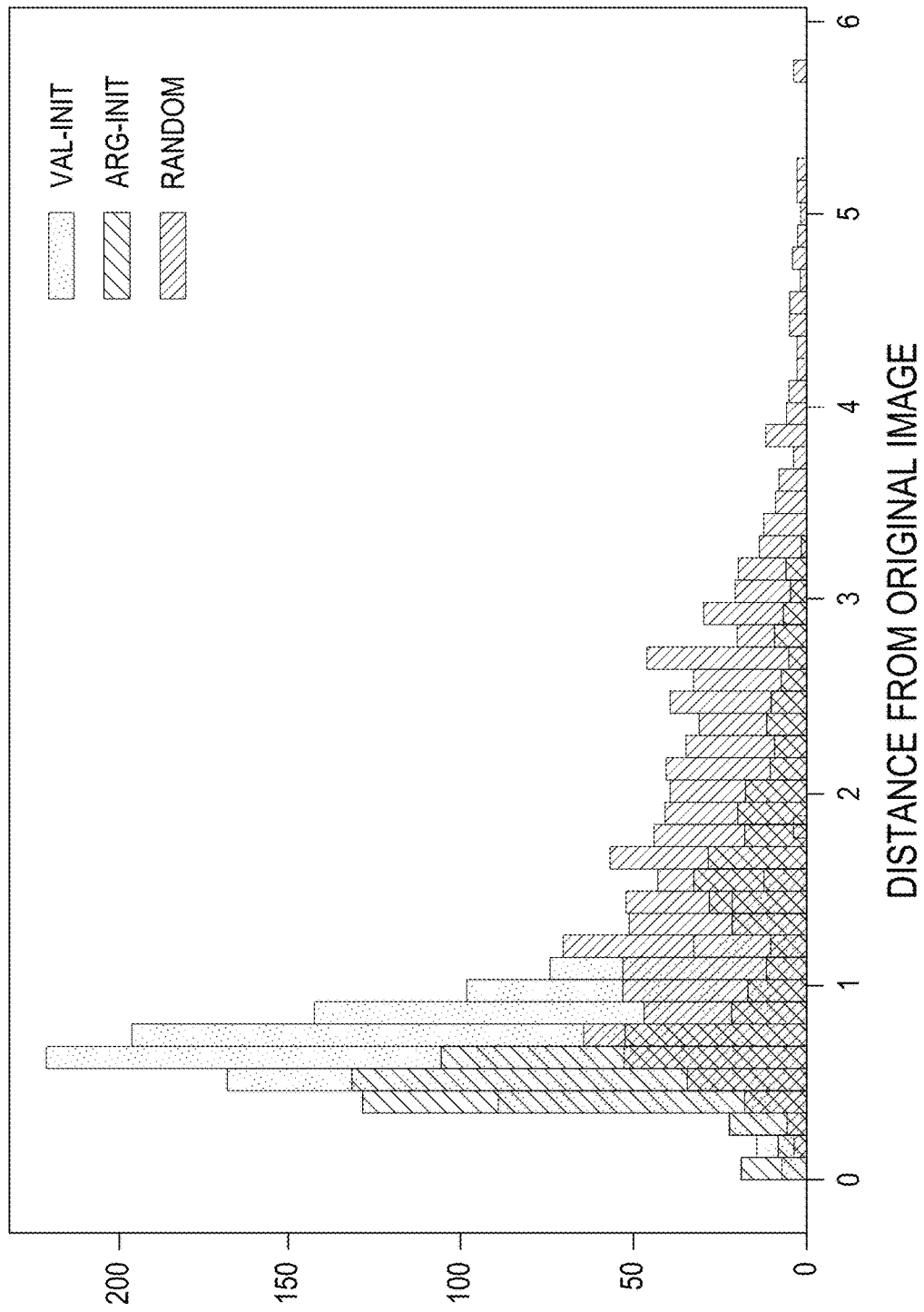
FIG. 11 is an exemplary graph, in accordance with an embodiment of the present invention.

FIG. 11 contains exemplary graph 1100, in accordance with an embodiment of the present invention. Exemplary graph 1100 details an exemplary graph depicting adversarial examples on MNIST by comparing the distance of the image across instances (e.g., Val-init, Arg-int, and Random).

FIG. 12 contains exemplary adversarial examples, in accordance with an embodiment of the present invention. The exemplary examples in graph 1200 compare initialization and the quality of the final solution, wherein below each exemplary adversarial example the class prediction and distance from the original class is listed. The left column is the random method, middle column is Val-Init, and right column is Arg-Init. Further, FIG. 12 depicts a problem instance for the problem family of generating adversarial examples, wherein the image of the digit number one in the second row corresponds to the problem instance for which various embodiments of the present invention generate adversarial example.

Figure 13:
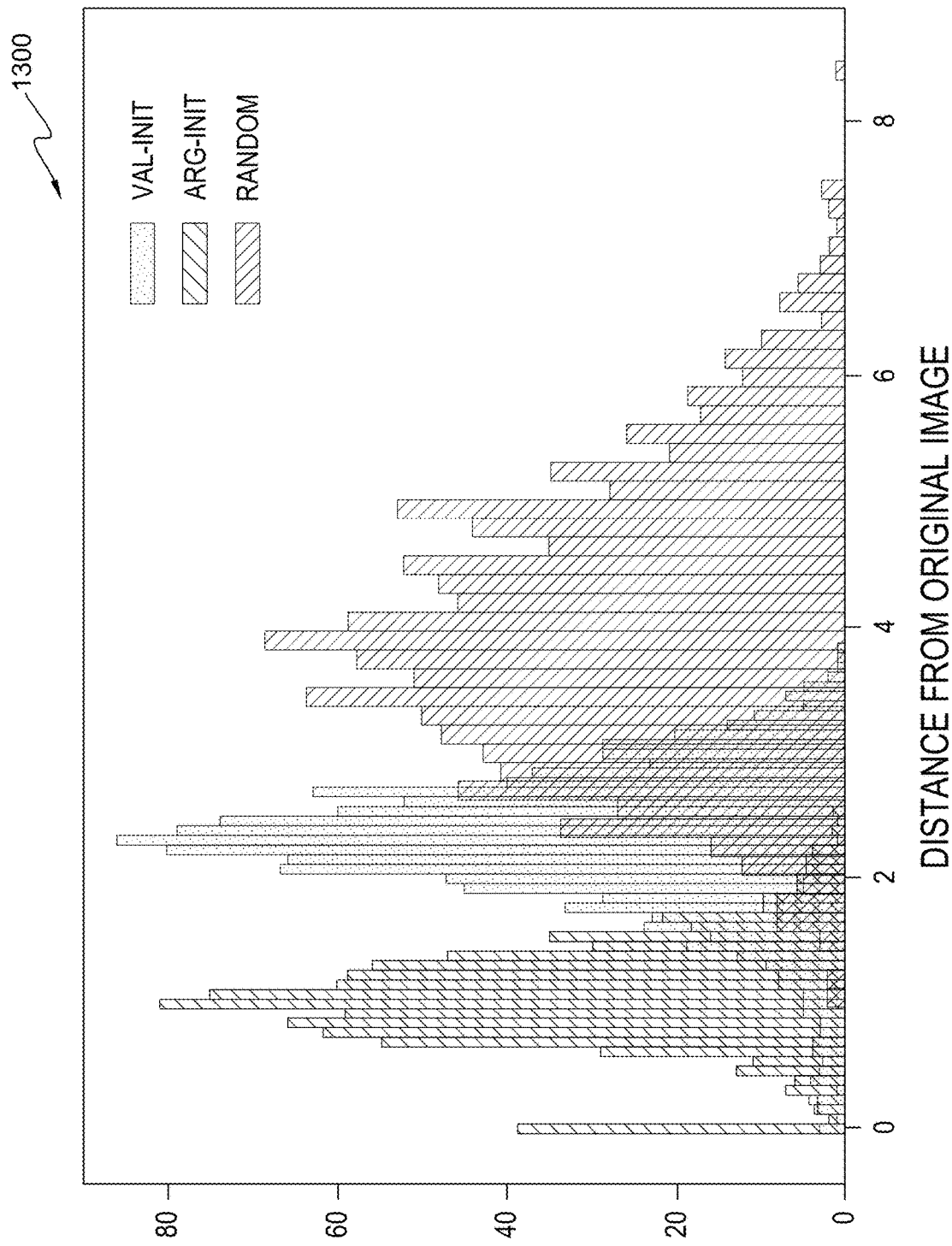
FIG. 13 is an exemplary graph, in accordance with an embodiment of the present invention.

FIG. 13 contains exemplary graph 1300, in accordance with an embodiment of the present invention. Exemplary graph 1300 details an exemplary graph depicting contrastive explanations on MNIST by comparing the distance of the image across instances (e.g., Val-init, Arg-int, and Random).

FIG. 14 contains exemplary contrastive examples, in accordance with an embodiment of the present invention. The exemplary examples in graph 1400 compare initialization and the quality of the final solution, wherein below each exemplary contrastive example the class prediction and distance from the original class is listed. The left column is the random method, middle column is Val-Init, and right column is Arg-Init. Further, FIG. 14 depicts a problem instance for the problem family of generating contrastive explanations. The image of the digit number one in second row corresponds to the problem instance for which optimization component 122 generates a contrastive explanation.

Figure 15:
FIG. 15 is an exemplary table, in accordance with an embodiment of the present invention.

FIG. 15 contains exemplary table 1500, in accordance with an embodiment of the present invention. Exemplary table 1500 contains an exemplary table containing 3 datasets comparing random, Val-Init, Arg-Init, methods. FIG. 15 depicts the sum-rate's average value and the number of iterations per instance in test phase for the different methods.

Figure 16:
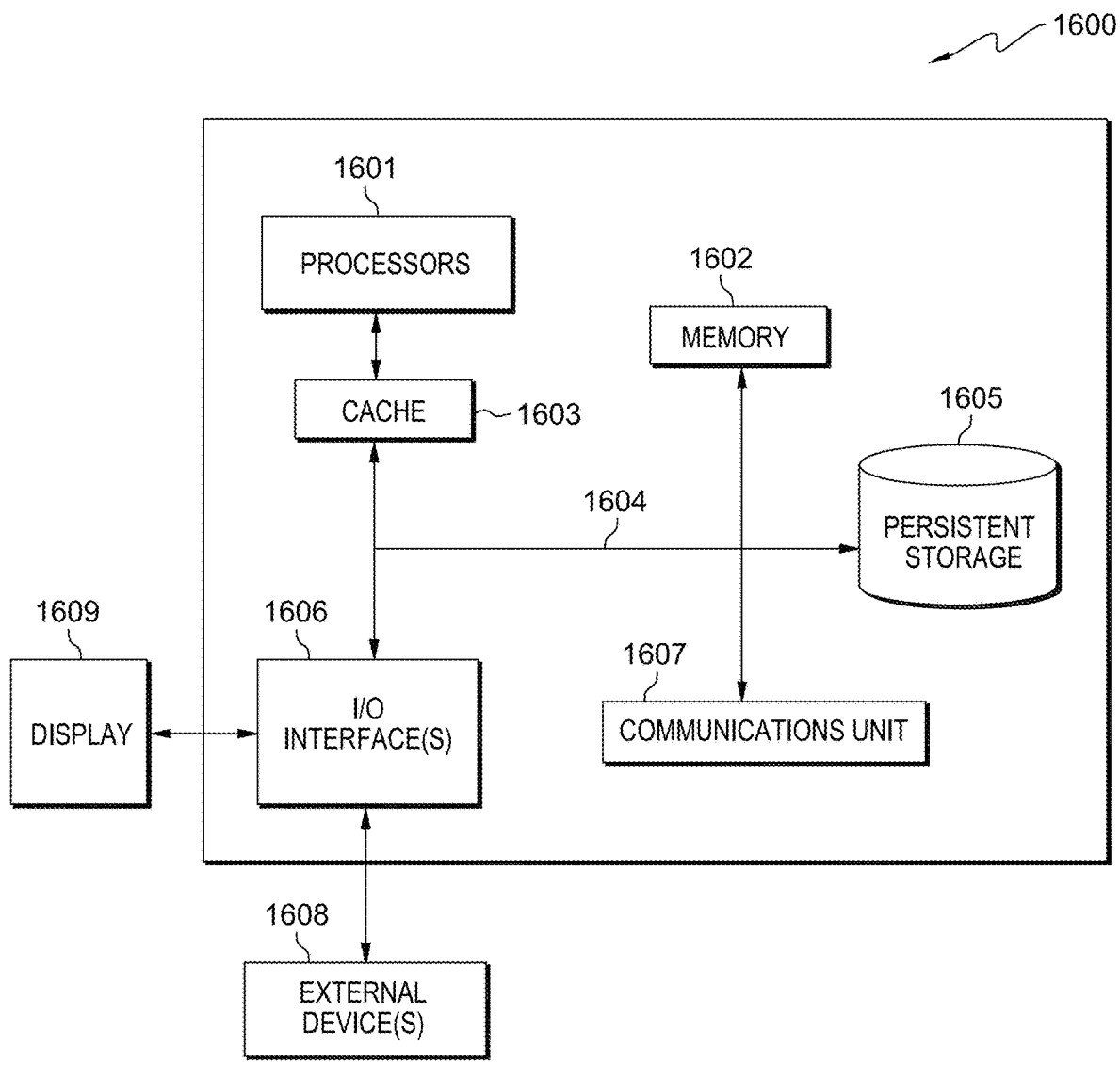
FIG. 16 depicts a block diagram of components of the server computer executing the initializing optimization component within the distributed data processing environment of FIG. 1, in accordance with an embodiment of the present invention.

FIG. 16 depicts a block diagram of components of server computer 120 within distributed data processing environment 100 of FIG. 1, in accordance with an embodiment of the present invention. It should be appreciated that FIG. 16 provides only an illustration of one implementation and does not imply any limitations with regard to the environments in which different embodiments may be implemented. Many modifications to the depicted environment may be made.

FIG. 16 depicts computer system 1600, where server computing 120 represents an example of computer system 1600 that includes optimization component 122. The computer system includes processors 1601, cache 1603, memory 1602, persistent storage 1605, communications unit 1607, input/output (I/O) interface(s) 1606, display 1609, external device(s) 1608 and communications fabric 1604. Communications fabric 1604 provides communications between cache 1603, memory 1602, persistent storage 1605, communications unit 1607, and input/output (I/O) interface(s) 1606. Communications fabric 1604 may be implemented with any architecture designed for passing data and/or control information between processors (such as microprocessors, communications, and network processors, etc.), system memory, peripheral devices, and any other hardware components within a system. For example, communications fabric 1604 may be implemented with one or more buses or a crossbar switch.

Memory 1602 and persistent storage 1605 are computer readable storage media. In this embodiment, memory 1602 includes random access memory (RAM). In general, memory 1602 may include any suitable volatile or non-volatile computer readable storage media. Cache 1603 is a fast memory that enhances the performance of processors 1601 by holding recently accessed data, and data near recently accessed data, from memory 1602.

Program instructions and data used to practice embodiments of the present invention may be stored in persistent storage 1605 and in memory 1602 for execution by one or more of the respective processors 1601 via cache 1603. In an embodiment, persistent storage 1605 includes a magnetic hard disk drive. Alternatively, or in addition to a magnetic hard disk drive, persistent storage 1605 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 1605 may also be removable. For example, a removable hard drive may be used for persistent storage 1605. Other examples include optical and magnetic disks, thumb drives, and smart cards that are inserted into a drive for transfer onto another computer readable storage medium that is also part of persistent storage 1605.

Communications unit 1607, in these examples, provides for communications with other data processing systems or devices. In these examples, communications unit 1607 includes one or more network interface cards. Communications unit 1607 may provide communications through the use of either or both physical and wireless communications links. Program instructions and data used to practice embodiments of the present invention may be downloaded to persistent storage 1605 through communications unit 1607.

I/O interface(s) 1606 enables for input and output of data with other devices that may be connected to each computer system. For example, I/O interface 1606 may provide a connection to external devices 1608 such as a keyboard, keypad, a touch screen, and/or some other suitable input device. External devices 1608 may also include portable computer readable storage media such as, for example, thumb drives, portable optical or magnetic disks, and memory cards. Software and data used to practice embodiments of the present invention may be stored on such portable computer readable storage media and may be loaded onto persistent storage 1605 via I/O interface(s) 1606. I/O interface(s) 1606 also connect to display 1609.

Display 1609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for utilizing a machine learning model to solve a sequential optimization problem, the method comprising:
   receiving, by a computing device, a sequential optimization problem for solving;
   utilizing, by the computing device, a learning based initializer and a gradient descent solver to solve a first instance of the sequential optimization problem;
   learning, by the computing device a machine learning model, based on one or more solutions to the first instance of the sequential optimization problem, wherein learning by the computing device the machine learning model comprises:
      sending the sequential optimization problem to the learning-based initializer and the gradient descent-based solver;
      generating, by the learning-based initializer an initialization and sending the initialization to the gradient descent-based solver;
      initiating, through the gradient descent-based solver, a search for a solution based on the initialization and an instance input;
      sending, by the gradient descent-based solver, a current solution to an objective function, wherein the objective function returns a value of the objective function for the current solution to the gradient descent-based solve, and wherein the objective function is minimized and continuously differentiable for non-convex optimization; and
      utilizing, through the gradient descent-based solver, the objective function to propose a next solution;
   generating, by the computing device the machine learning model, one or more subsequent approximate solutions to the sequential optimization problem; and
   outputting, by a user interface on the computing device, the one or more subsequent approximate solutions to the sequential optimization problem.

2. The computer-implemented method of claim 1, further comprising:
   building two approaches from learned past optimization solutions, wherein the two approaches comprise: non-convex optimization and gradient-descent solvers, wherein in the non-convex optimization, different initialization lead to different local minima with different values.

3. The computer-implemented method of claim 2, wherein a first approach comprises:
   learning to differentiate different initial values and select initial values that lead to a minimum, wherein the gradient-descent solvers converge to a certain stationary point faster provided an initialization is closer to the stationary point; and
   wherein a second approach comprises:
      learning a map from instance, initialization to objective value;
      generating a random initialization; and
      utilizing the map to generate a new initialization.

4. The computer-implemented method of claim 3, wherein the first approach and the second approach are each divided into two phases, wherein a first phase, of both the first approach and the second approach, for incoming problem instance comprises:
   executing the random initialization to solve the sequential optimization problem; and
   storing data associated with the execution of the random initialization to solve the problem, wherein the data comprises: the problem instance, the initialization used, and argument of a solution and objective function value.

5. The computer-implemented method of claim 3, wherein a second phase of the first approach comprises:
   learning one or more models that receive the problem instance and the initialization as input; and
   outputting an approximate objective function value as the solution.

6. The computer-implemented method of claim 3, wherein a second phase of the second approach comprises:
   learning a model that takes the problem instance and the initialization as input and outputs an approximation of a solution argument; and
   generating a random initial value and using the model to predict the solution argument for an incoming instance, wherein the predicted solution argument is used as the initialization.

7. The computer-implemented method of claim 1, further comprising:
   implementing the one or more subsequent approximate solutions to the one or more sequential optimization problems.

8. A computer program product for utilizing a machine learning model to solve a sequential optimization problem, the computer program product comprising:
   one or more computer readable storage medium and program instructions stored on the one or more computer readable storage medium, the stored program instructions comprising:
   program instruction to receive, by a computing device, a sequential optimization problem for solving;
   program instruction to utilize, by the computing device, a learning based initializer and a gradient descent solver to solve a first instance of the sequential optimization problem;
   program instruction to learn, by the computing device a machine learning model, based on one or more solutions to the first instance of the sequential optimization problem, wherein learning by the computing device the machine learning model comprises:
      program instructions to send the sequential optimization problem to the learning-based initializer and the gradient descent-based solver;
      program instructions to generate, by the learning-based initializer an initialization and sending the initialization to the gradient descent-based solver;
      program instructions to execute, through the gradient descent-based solver, a search for a solution based on the initialization and an instance input;
      program instructions to send, by the gradient descent-based solver, a current solution to an objective function, wherein the objective function returns a value of the objective function for the current solution to the gradient descent-based solver, and wherein the objective function is minimized and continuously differentiable for non-convex optimization; and
      program instructions to utilize, through the gradient descent-based solver, the objective function to propose a next solution;
   program instruction to generate, by the computing device the machine learning model, one or more subsequent approximate solutions to the sequential optimization problem; and
   program instruction to output, by a user interface on the computing device, the one or more subsequent approximate solutions to the sequential optimization problem.

9. The computer program product of claim 8, further comprising:
   program instruction to build two approaches from learned past optimization solutions, wherein the two approaches comprise: non-convex optimization and gradient-descent solvers, wherein in the non-convex optimization, different initialization lead to different local minima with different values.

10. The computer program product of claim 9, wherein a first approach comprises:
    program instruction to learn to differentiate different initial values and select initial values that lead to a minimum, wherein the gradient-descent solvers converge to a certain stationary point faster provided an initialization is closer to the stationary point; and
    wherein a second approach comprises:
       program instructions to learn a map from instance, initialization to objective value;
       program instructions to generate a random initialization; and
       program instructions to utilize the map to generate a new initialization.

11. The computer program product of claim 10, wherein the first approach and the second approach are each divided into two phases, wherein a first phase, of both the first approach and the second approach, for incoming problem instance comprises:
    program instruction to execute the random initialization to solve the sequential optimization problem; and
    program instruction to store data associated with the execution of the random initialization to solve the problem, wherein the data comprises: the problem instance, the initialization used, and argument of a solution and objective function value.

12. The computer program product of claim 10, wherein a second phase of the first approach comprises:
    program instruction to learn one or more models that receive the problem instance and the initialization as input; and
    program instruction to output an approximate objective function value as the solution.

13. The computer program product of claim 10, wherein a second phase of the second approach comprises:
    program instruction to learn a model that takes the problem instance and the initialization as input and outputs an approximation of a solution argument; and
    program instruction to generate a random initial value and using the model to predict the solution argument for an incoming instance, wherein the predicted solution argument is used as the initialization.

14. The computer program product of claim 8, further comprising:
    program instruction to implement the one or more subsequent approximate solutions to the one or more sequential optimization problems.

15. A computer system for utilizing a machine learning model to solve a sequential optimization problem, the computer system comprising:
    one or more computer processors;
    one or more computer readable storage devices;
    program instructions stored on the one or more computer readable storage devices for execution by at least one of the one or more computer processors, the stored program instructions comprising:
    program instruction to receive, by a computing device, a sequential optimization problem for solving;
    program instruction to utilize, by the computing device, a learning based initializer and a gradient descent solver to solve a first instance of the sequential optimization problem;
    program instruction to learn, by the computing device a machine learning model, based on one or more solutions to the first instance of the sequential optimization problem, wherein learning by the computing device the machine learning model comprises:

program instructions to send the sequential optimization problem to the learning-based initializer and the gradient descent-based solver;

program instructions to generate, by the learning-based initializer an initialization and sending the initialization to the gradient descent-based solver;

program instructions to execute, through the gradient descent-based solver, a search for a solution based on the initialization and an instance input;

program instructions to send, by the gradient descent-based solver, a current solution to an objective function, wherein the objective function returns a value of the objective function for the current solution to the gradient descent-based solver, and wherein the objective function is minimized and continuously differentiable for non-convex optimization; and program instructions to utilize, through the gradient descent-based solver, the objective function to propose a next solution;

program instruction to generate, by the computing device the machine learning model, one or more subsequent approximate solutions to the sequential optimization problem; and program instruction to output, by a user interface on the computing device, the one or more subsequent approximate solutions to the sequential optimization problem.

16. The computer system of claim 15, further comprising:

program instruction to build two approaches from learned past optimization solutions, wherein the two approaches comprise: non-convex optimization and gradient-descent solvers, wherein in the non-convex optimization, different initialization lead to different local minima with different values; and program instruction to learn to differentiate different initial values and select initial values that lead to a minimum, wherein the gradient-descent solvers converge to a certain stationary point faster provided an initialization is closer to the stationary point; and wherein a second approach comprises:

program instructions to learn a map from instance, initialization to objective value;

program instructions to generate a random initialization; and program instructions to utilize the map to generate a new initialization.

17. The computer system of claim 16, wherein the first approach and the second approach are each divided into two phases, wherein a first phase, of both the first approach and the second approach, for incoming problem instance comprises:

program instruction to execute the random initialization to solve the sequential optimization problem; and program instruction to store data associated with the execution of the random initialization to solve the problem, wherein the data comprises: the problem instance, the initialization used, and argument of a solution and objective function value.

18. The computer system of claim 16, wherein a second phase of the first approach comprises:

program instruction to learn one or more models that receive the problem instance and the initialization as input; and program instruction to output an approximate objective function value as the solution.

19. The computer system of claim 16, wherein a second phase of the second approach comprises:

program instruction to learn a model that takes the problem instance and the initialization as input and outputs an approximation of a solution argument; and program instruction to generate a random initial value and using the model to predict the solution argument for an incoming instance, wherein the predicted solution argument is used as the initialization.

20. The computer system of claim 15, further comprising:

program instruction to implement the one or more subsequent approximate solutions to the one or more sequential optimization problems.

* * * * *